(12) United States Patent
Liu et al.

(10) Patent No.: US 11,157,942 B2
(45) Date of Patent: Oct. 26, 2021

(54) DYNAMIC INFORMATION PRESENTATION SYSTEM, METHOD, AND APPARATUS, AND TERMINAL

(71) Applicant: TENCENT TECHNOLOGY (SHENZHEN) COMPANY LIMITED, Guangdong (CN)

(72) Inventors: Fang Fang Liu, Shenzhen (CN); Xun Yao, Shenzhen (CN); Yang Liu, Shenzhen (CN); Jin Huang, Shenzhen (CN); Shu Yuan Li, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 68 days.

(21) Appl. No.: 16/111,433

(22) Filed: Aug. 24, 2018

(65) Prior Publication Data
US 2018/0365727 A1 Dec. 20, 2018

Related U.S. Application Data

(63) Continuation of application No. PCT/CN2017/077490, filed on Mar. 21, 2017.

(30) Foreign Application Priority Data

Mar. 21, 2016 (CN) .......................... 201610158107.8

(51) Int. Cl.
G06Q 30/02 (2012.01)
G06Q 50/00 (2012.01)

(52) U.S. Cl.
CPC ..... *G06Q 30/0239* (2013.01); *G06Q 30/0261* (2013.01); *G06Q 50/01* (2013.01)

(58) Field of Classification Search
None
See application file for complete search history.

(56) References Cited

U.S. PATENT DOCUMENTS 8,532,672 B2 * 9/2013 Kruglick ............... H04W 64/00
455/456.1
8,903,909 B1 * 12/2014 Marra ................... G06Q 50/01
709/204

(Continued)

FOREIGN PATENT DOCUMENTS

CN 102929892 A 2/2013
CN 103078786 A 5/2013

(Continued)

OTHER PUBLICATIONS

Li et al., "Building a targeted mobile advertising system for location-based services," Elsevier, Decision Support Systems 54 (2012) pp. 1-8. (Year: 2012).*

(Continued)

*Primary Examiner* — Christopher B Tokarczyk
(74) *Attorney, Agent, or Firm* — Sughrue Mion, PLLC

(57) ABSTRACT

A dynamic information presentation method includes: obtaining a dynamic information flow corresponding to a first user account of an application, the dynamic information flow being an information flow for providing dynamic information of a second user account of the application; determining a promoted account matching the first user account, by a platform server relating to the application, according to a first geographic location associated with the first user account and a second geographic location associated with the promoted account, the dynamic information flow further comprising dynamic information of the promoted account matching the first user account; and displaying the dynamic information flow corresponding to the first user account.

15 Claims, 12 Drawing Sheets

(56) References Cited

U.S. PATENT DOCUMENTS

| | | | | |
|---|---|---|---|---|
| 2002/0077084 | A1* | 6/2002 | Zellner | G06Q 30/0267 |
| | | | | 455/414.2 |
| 2005/0245241 | A1* | 11/2005 | Durand | H04L 65/602 |
| | | | | 455/414.1 |
| 2007/0174259 | A1* | 7/2007 | Amjadi | G06Q 30/02 |
| 2008/0294522 | A1 | 11/2008 | Teterin | |
| 2009/0119167 | A1* | 5/2009 | Kendall | G06Q 30/02 |
| | | | | 705/14.17 |
| 2012/0066067 | A1* | 3/2012 | Curtis | G06Q 30/0269 |
| | | | | 705/14.58 |
| 2012/0259790 | A1* | 10/2012 | Hu | G06Q 50/01 |
| | | | | 705/319 |
| 2013/0073473 | A1* | 3/2013 | Heath | G06Q 30/02 |
| | | | | 705/319 |
| 2013/0304585 | A1* | 11/2013 | Atazky | H04L 51/32 |
| | | | | 705/14.66 |
| 2014/0236700 | A1* | 8/2014 | Abhyanker | G06Q 10/10 |
| | | | | 705/14.35 |
| 2015/0058756 | A1 | 2/2015 | Kwak | |

FOREIGN PATENT DOCUMENTS

| | | | |
|---|---|---|---|
| CN | 103425386 | A | 12/2013 |
| CN | 103458009 | A | 12/2013 |
| CN | 103473227 | A | 12/2013 |
| CN | 104486204 | A | 4/2015 |
| CN | 105847114 | A | 8/2016 |
| EP | 1 857 944 | A1 | 11/2007 |
| JP | 2003-263597 | A | 9/2003 |
| JP | 2010-531626 | A | 9/2010 |
| JP | 2010-537323 | A | 12/2010 |
| JP | 2015-531176 | A | 10/2015 |
| JP | 2016-502167 | A | 1/2016 |
| KR | 10-2013-0129213 | A | 11/2013 |
| KR | 10-2014-0021545 | A | 2/2014 |
| KR | 10-1585119 | B1 | 1/2016 |

OTHER PUBLICATIONS

Communication dated Sep. 29, 2019 issued in Chinese Application No. 201610158107.8.

Office Action dated May 13, 2019 in Korean Application No. 10-2018-7018256.

Office Action dated Jul. 1, 2019 in Japanese Application No. 2018-533624.

Nikkei Computer, No. 864, Jul. 8, 2014, Nikkei Business Publications (6 pages total).

Office Action dated Mar. 18, 2019 in Japanese Application No. 2018-533624.

Written Opinion of the International Searching Authority dated May 31, 2017 in International Application No. PCT/CN2017/077490.

Communication dated Dec. 13, 2019, from the China National Intellectual Property Administration in counterpart Application No. 201610158107.8.

International Search Report of PCT/CN2017/077490 dated May 31, 2017.

Communication dated Jun. 16, 2020 by the Intellectual Property Office on India in application No. 201817021130.

* cited by examiner

DYNAMIC INFORMATION PRESENTATION SYSTEM, METHOD, AND APPARATUS, AND TERMINAL

CROSS-REFERENCE TO RELATED APPLICATIONS

This application is a continuation application of International Application No. PCT/CN2017/077490, filed on Mar. 21, 2017, in the Chinese Patent Office, which claims priority to Chinese Patent Application No. 201610158107.8, entitled "DYNAMIC INFORMATION PRESENTATION SYSTEM, METHOD, AND APPARATUS", filed on Mar. 21, 2016, in the Chinese Patent Office, the disclosures of which are incorporated by reference in their entireties.

BACKGROUND

1. Field

Exemplary embodiments of the disclosure relate to the field of information pushing, and in particular, to a dynamic information presentation system, method, and apparatus, and a terminal.

2. Description of Related Art

A social application is frequently used on a mobile terminal. The social application provides a dynamic information presentation function.

The dynamic information presentation function is a function by using which a user releases dynamic information of the user on a dynamic information release platform, and other users having a friendship with the user can view, on the platform, the dynamic information released by the user. On the dynamic information release platform, each user corresponds to a dynamic information flow corresponding to an account of the user. The dynamic information flow includes dynamic information released by other users having a friendship with the user, and the dynamic information is usually presented in a timeline form. For example, when a user obtains a dynamic information flow corresponding to a first user account from the dynamic information release platform, the user can obtain a self-portrait released by a second user account A, an article released by a second user account B, a short video released by a second user account C, and the like. Each second user account is a friend of the first user account.

The related art dynamic information presentation functions display only dynamic information released by other uses having a friendship, and a number of a presented information type is single or limited number.

SUMMARY

One or more exemplary embodiments provide a dynamic information presentation system, method, and apparatus, and a terminal that solve the problem that the related art dynamic information presentation functions display only dynamic information released by other uses having a friendship.

According to an aspect of an exemplary embodiment, a dynamic information presentation system is provided, the system including a user terminal logged in with a first user account of an application and a platform server relating to the application;

the platform server being configured to: obtain a first geographic location associated with the first user account and a second geographic location associated with a promoted account, and determine, according to the first geographic location and the second geographic location, the promoted account matching the first user account;

the platform server being configured to: add dynamic information of the promoted account to a dynamic information flow corresponding to the first user account, and provide the user terminal with the dynamic information flow, the dynamic information flow being an information flow for providing dynamic information of a second user account of the application; and the user terminal being configured to: obtain and provide the dynamic information flow corresponding to the first user account.

According to another aspect of an exemplary embodiment, a dynamic information presentation method is provided, the method including:

obtaining a dynamic information flow corresponding to a first user account of an application, the dynamic information flow being an information flow for providing dynamic information of a second user account of the application, the dynamic information flow further comprising dynamic information of a promoted account matching the first user account, the promoted account matching the first user account being determined, by a platform server relating to the application, according to a first geographic location associated with the first user account and a second geographic location associated with the promoted account; and displaying the dynamic information flow corresponding to the first user account.

According to still another aspect of an exemplary embodiment, a dynamic information presentation apparatus is provided, the apparatus including:

at least one memory operable to store program code; and at least one processor operable to read the program code, and operate as instructed by the program code to:

receive a dynamic information flow corresponding to a first user account of an application, the dynamic information flow being an information flow for providing dynamic information of a second user account of the application, the dynamic information flow further comprising dynamic information of a promoted account matching the first user account, the promoted account matching the first user account being determined by a platform server relating to the application based on a first geographic location of the first user account and a second geographic location of the promoted account; and display the dynamic information flow corresponding to the first user account.

According to still another aspect of an exemplary embodiment, a non-transitory computer-readable storage medium having stored therein a computer readable code is provided, the computer readable code, when executed by a computer, causing the computer to perform:

obtaining a dynamic information flow corresponding to a first user account of an application, the dynamic information flow being an information flow for providing dynamic information of a second user account of the application, the dynamic information flow further comprising dynamic information of a promoted account matching the first user account, the promoted account matching the first user account being determined by a platform server of the application based on a first geographic location of the first user account and a second geographic location of the promoted account; and displaying the dynamic information flow corresponding to the first user account.

BRIEF DESCRIPTION OF THE DRAWINGS

The above and/or other aspects of the disclosure will become apparent and more readily appreciated from the following description of the exemplary embodiments, taken in conjunction with the accompanying drawings.

DETAILED DESCRIPTION

Figure 1:
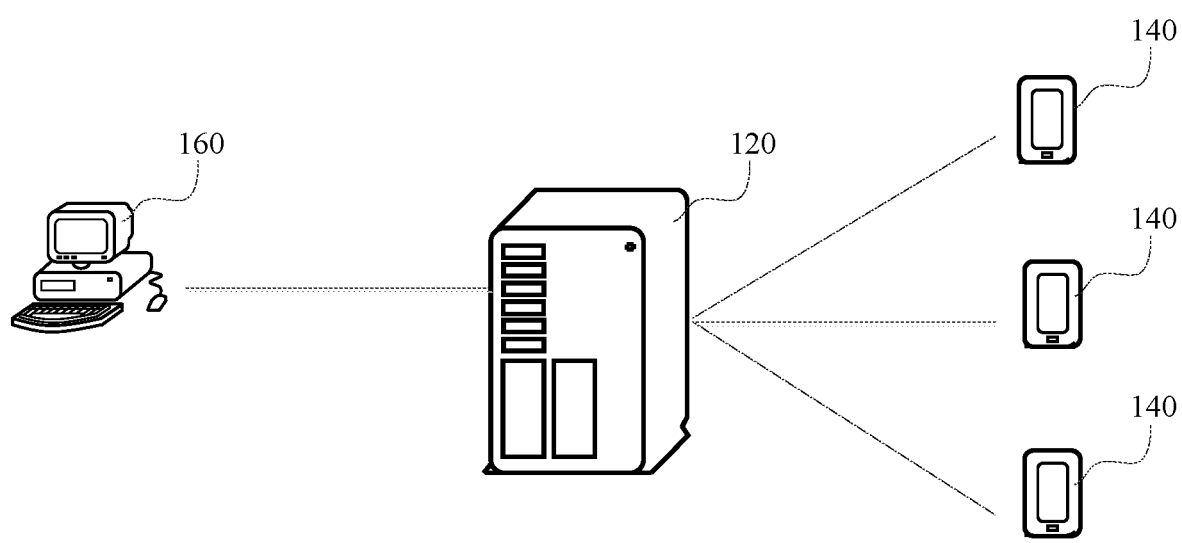
FIG. 1 is a schematic structural diagram of a dynamic information presentation system according to an exemplary embodiment.

To make the objectives, technical solutions, and advantages of the disclosure clearer, the following further describes implementations of the disclosure in detail with reference to the accompanying drawings.

It should be understood that "multiple" mentioned herein means two or more. "And/or" describes an association relationship of associated objects and represents that three relationships may exist. For example, A and/or B may represent the following three cases: Only A exists, both A and B exist, and only B exists. The character "/" usually indicates an "or" relationship between the associated objects.

The sequence numbers of the foregoing embodiments are merely for description purpose but do not indicate the preference of the embodiments.

It should be noted that in some alternative implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved.

Terms described herein are selected by considering functions in an exemplary embodiment and meanings may vary depending on, for example, a user or operator's intentions or customs. Therefore, in the following embodiments, when terms are specifically defined, the meanings of terms should be interpreted based on definitions, and otherwise, should be interpreted based on general meanings recognized by those skilled in the art.

As used herein, the singular forms are intended to include the plural forms as well, unless the context clearly indicates otherwise. It will be further understood that the terms "comprises" and/or "comprising," or "includes" and/or "including" when used in this description, specify the presence of stated features, numbers, steps, operations, elements, components or combinations thereof, but do not preclude the presence or addition of one or more other features, numbers, steps, operations, elements, components or combinations thereof.

The "unit" or "module" used herein may be a hardware component such as a processor or a circuit, and/or a software component that is executed by a hardware component such as a processor.

Social client is an application having a social attribute, and usually has an instant messaging function and a dynamic information presentation function, an instant messaging program, a voice communication program, a group voice tool, a rich-media social tool, a game platform, a microblog, a transaction platform, and the like.

The instant messaging function is a function by which two users perform instant messaging therebetween by using at least one of a text message, a voice message, an expression message, a picture message, or a video message.

The dynamic information presentation function is a function by which a user releases dynamic information of the user on a dynamic information release platform, and other users having a social relationship with the user can view, on the platform, the dynamic information released by the user. On the dynamic information release platform, each user corresponds to a dynamic information flow corresponding to an account of the user. The dynamic information flow includes dynamic information released by other users having a social relationship with the user, and the dynamic information is usually presented in a timeline form. The social relationship includes at least one of having a friendship, belonging to a friendship, a same group relationship, or a follow relationship that are in the social client. In some embodiments, the user is authorized to perform settings, to view or hide a dynamic message of another user in the dynamic information flow corresponding to the user account. The dynamic information release platform may have different names on different social clients, such as, for example but not limited to, Moments, Circle of Good Friends, Networking Circle, Living Circle, and Mircoblog.

The user account is an account that is applied for by an individual in the platform server and that is used for individual social interaction. When the account is logged in to a current social client, the account is used by a social platform server and other social clients, to identify an individual user identity of the current social client.

An official account is an account that is applied by a government department, an organization, an agency, a group, or an individual in the platform server and that is public-oriented. The government department, the organization, the agency, the group, or the individual is usually a unit to which users pay more attention, for example, a merchant, a company, an enterprise, a government, a hospital, a media agency, or a famous person.

A promoted account is an account having a promotion requirement in the platform server. Alternatively, the promoted account is an account that is applied for by the organization, the agency, the group, or the individual in the platform server and that has the promotion demand. The promoted account may be an official account having the promotion demand. In some specific situations, the promoted account may be an official account corresponding to a point of interest (POI) point or a geographic location. For example, a coffee shop located at No. XX, XXX Street, Chaoyang District, Beijing City registers an official account "XX Coffee", and when the official account "XX Coffee" corresponds to a POI point "No. XX, XXX Street, Chaoyang District, Beijing City", the official account may become a promoted account for use.

The dynamic information is information released by a user account or an official account on the dynamic information release platform at a time. Each piece of dynamic information includes, but is not limited to, picture information, text information, voice information, video information, and so on.

In an actual application, the user may log in to the social client by using the user account, and obtains a dynamic information flow from the dynamic information release platform by using the social client. The dynamic information flow may include dynamic information of another user account and dynamic information of the promoted account. The social client may present, in a timeline form, each piece of dynamic information included in the dynamic information flow.

FIG. 1 is a schematic structural diagram of a dynamic information presentation system according to an exemplary embodiment. The dynamic information presentation system includes a platform server 120, a user terminal 140 logged in with a first user account, and a promoted account terminal 160.

The platform server 120 is a server providing background services for a social client. Optionally, the platform server 120 is at least one server, a server cluster, a distributed server platform, a cloud computing center, or a combination of several server clusters.

The platform server 120 is configured to: obtain a first geographic location associated with the first user account (or a first geographic location of the user terminal 140) and a second geographic location associated with a promoted account, and determine, according to the first geographic location and the second geographic location, a promoted account matching the first user account. Optionally, the promoted account initially has no social relationship with the first user account. The platform server 120 establishes an association between the promoted account and the first user account by using a relationship between the first geographic location and the second geographic location. Optionally, the first geographic location is any one of a historically input geographic location associated with the first user account, a geographic location associated with the first user account of historical login, a geographic location associated with the first user account of historical sign-in, a historically reported geographic location associated with the first user account, or a geographic location associated with the first user account reported in real time.

The platform server 120 is further configured to add dynamic information of the promoted account matching the first user account to a dynamic information flow corresponding to the first user account. After the addition, the dynamic information flow corresponding to the first user account includes not only dynamic information of a second user account, but also the dynamic information of the promoted account. Optionally, there is more than one second user account. Optionally, the second user account has the social relationship with the first user account.

Optionally, the dynamic information of the second user account includes at least one type of information of picture information, text information, voice information, video information, geographic location information, or external link information.

Optionally, the dynamic information of the promoted account includes account information and content information. The content information includes, but is not limited to, at least one type of information of picture information, text information, voice information, video information, geographic location information, coupon information, external link information, or a promoted identifier.

Optionally, the dynamic information flow corresponding to the first user account is presented in a timeline form.

The platform server 120 is further configured to provide the user terminal 140 with the dynamic information flow corresponding to the first user account.

The user terminal 140 establishes communication with the platform server 120 by using a wired network or a wireless network. A social client operates in the user terminal 140, and the social client is logged in with the first user account.

Figure 2:
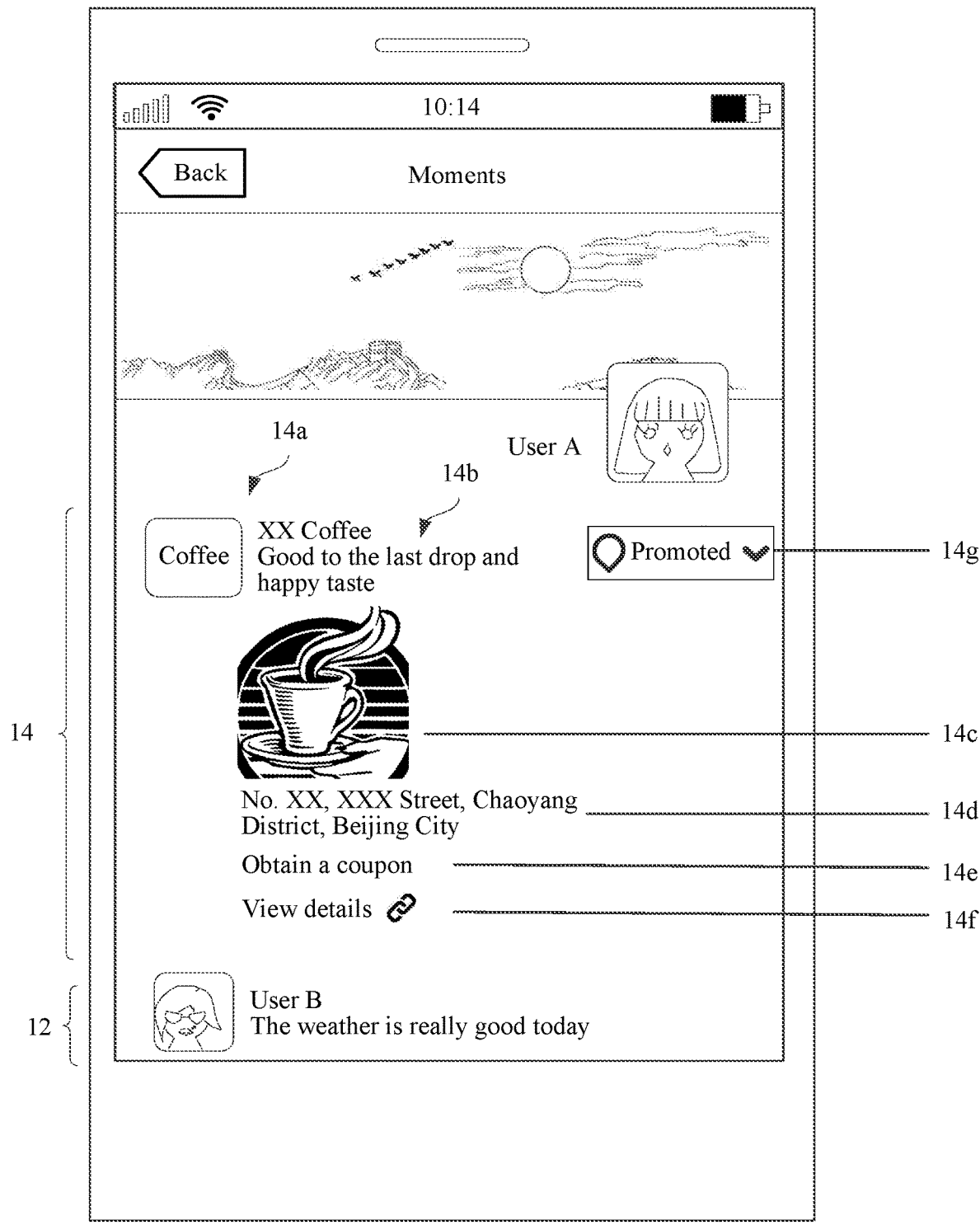
FIG. 2 is a schematic diagram of presentation of a dynamic information flow corresponding to a first user account according to an exemplary embodiment.

The user terminal 140 is configured to obtain and present the dynamic information flow corresponding to the first user account. A presentation interface of the dynamic information flow corresponding to the first user account is schematically shown in FIG. 2. A nickname of the first user account is "User A". The dynamic information flow that is sorted in an order from a last time to an earlier time of the timeline includes dynamic information 12 of the second user account and the dynamic information 14 of the promoted account.

The dynamic information 12 of the second user account includes account information "User B and a profile photo" and text information "The weather is really good today" that are of the second user account. The user B has a friendship with the user A.

The dynamic information 14 of the promoted account includes account information 14a "XX Coffee and a profile photo", text information 14b "Good to the last drop and happy taste", picture information 14c, geographic location information 14d "No. XX, XXX Street, Chaoyang District, Beijing City", coupon information 14e "Obtain a coupon", external link information 14f "View details", and a promoted identifier 14g that are of the promoted account.

Optionally, the first user account performs interaction with the dynamic information of the promoted account by means of a comment operation or a like operation. If the dynamic information of the promoted account is simultaneously added to the dynamic information flow of the first user account and a dynamic information flow of the second user account, an interaction operation performed by the first user account with the dynamic information of the promoted account can be read by the second user account, and an interaction operation performed by the second user account with the dynamic information of the promoted account can be read by the first user account.

In an aspect of obtaining the first geographic location of the user terminal 140 by the platform server 120, optional implementation manners including an off-line obtaining manner and a real-time obtaining manner may be employed.

The off-line obtaining manner is used in which the platform server 120 is configured to obtain the first geographic location by using historical data of the first user account. The historical data of the first user account includes at least one of historically input address information, a geographic location associated with historical login, a geographic location associated with historical sign-in, or a historically reported geographic location. For example, personal data information of the first user account is filled with a home address, and the platform server 120 determines that the home address is the first geographic location. For another example, a POI point in which the first user account recently signed in is a place A, the platform server 120 determines that the place A is the first geographic location.

The real-time obtaining manner is used in which the platform server 120 is configured to receive the first geographic location reported by the user terminal 140. For example, the user terminal 140 performs positioning at every preset time interval, and uses a positioning result as the first geographic location and reports the location result to the platform server 120. For another example, the user terminal 140 sends an information flow obtaining request to the platform server 120. The information flow obtaining request is used for obtaining the dynamic information flow corresponding to the first user account, and the obtaining request carries the first geographic location. The platform server 120 receives the information flow obtaining request. For still another example, the platform server 120 sends a location obtaining instruction to the user terminal 140, and the user terminal 140 reports the first geographic location to the platform server 120 according to the location obtaining instruction.

The method in which the platform server 120 obtains the first geographic location of the user terminal 140 is not specifically limited in this embodiment.

In an aspect of determining the promoted account matching the first user account by the platform server 120, the following optional implementation manners may be employed.

First, the platform server 120 is configured to determine, when a distance between the first geographic location and the second geographic location is less than a preset threshold, that the promoted account is the promoted account matching the first user account.

For example, the first geographic location of a user terminal A is "place A", the second geographic location corresponding to a promoted account B (or the second geographic location corresponding to a terminal associated with the promoted account B) is "place B", and the second geographic location corresponding to a promoted account C (or the second geographic location corresponding to a terminal associated with the promoted account C) is "place C". Because a distance between the place A and the place B is less than the preset threshold, and a distance between the place A and the place C is greater than the preset threshold, the platform server 120 determines that the promoted account B is the promoted account matching the first user account. In this implementation, the second geographic location is a relative precise geographic location point.

Second, the second geographic location may be a geographic area rather than a precise geographic location point, for example, "Chaoyang District, Beijing City". Therefore, the platform server 120 is configured to: obtain the second geographic location corresponding to each promoted account, detect whether the first geographic location is within a coverage of the second geographic location, and if the first geographic location is within the coverage of the second geographic location, determine that the promoted account corresponding to the second geographic location is the promoted account matching the first user account.

For example, the first geographic location of the user terminal A is "XX Street, Chaoyang District, Beijing City", the second geographic location corresponding to the promoted account B is "Chaoyang District, Beijing City", and the second geographic location corresponding to the promoted account C is "Haidian District, Beijing City". Because the place A belongs to Chaoyang District, Beijing City instead of Haidian District, Beijing, the platform server 120 determines that the promoted account B is the promoted account matching the first user account.

Third, the platform server 120 is configured to obtain at least one delivery condition corresponding to the promoted account. The at least one delivery condition includes that the distance between the first geographic location associated with the first user account and the second geographic location is less than the preset threshold. The platform server 120 is configured to detect whether the first user account meets each delivery condition of the promoted account, and when the first user account meets the each delivery condition of the promoted account, determines that the promoted account is the promoted account matching the first user account. In addition to a delivery condition related to the second geographic location, another delivery condition of the promoted account includes, but is not limited to, at least one of a gender condition, an age condition, an occupation condition, a hobby condition, a delivery time condition, a delivery time condition, or a delivery restriction condition.

For example, delivery conditions corresponding to the promoted account include that a distance between the first geographic location and a second geographic location "place D" is less than 1000 meters, and the gender is female. The platform server 120 is configured to: detect whether the distance between the first geographic location associated with the first user account and the second geographic location "place D" is less than 1000 meters, and detect whether the gender corresponding to the first user account is female; and if detection results are that the distance is less than 1000 meters and the gender is female, determine that the promoted account is the promoted account corresponding to the first user account.

The method in which the platform server 120 determines the promoted account matching the first user account is not specifically limited in this embodiment.

In an optional embodiment, the quantity of candidate promoted accounts that match the first geographic location and that are determined by the platform server 120 is two or more. After sorting the two or more candidate promoted accounts according to a preset sorting condition, the platform server 120 selects the candidate promoted account sorted on the top as the promoted account matching the first user account.

Schematically, the preset sorting condition includes an interaction intimacy of the second user account with the dynamic information of the promoted account. The interaction intimacy is represented by using an interaction frequency and/or interaction times of an interaction operation, the interaction operation including "Comment" or "Like". Because the dynamic information of the promoted account may have been added to dynamic information flows corresponding to some second user accounts, and the second user accounts perform interaction with the promoted account in a "Comment" or "Like" manner, the platform server 120 is configured to: calculate the interaction intimacy of the second user accounts with the dynamic information of the promoted account according to interaction times or interaction frequencies of the second user accounts, and sort the promoted account based on the interaction intimacy.

For example, the promoted account matching the first user account includes a promoted account A and a promoted account B. The first user account corresponds to 100 second user accounts. 25 second user accounts perform interaction operations with the dynamic information of the promoted account A, and 11 second user accounts perform interaction operations with the dynamic information of the promoted account B. Because 25 is greater than 11, the platform server 120 determines that the promoted account A is the promoted account matching the first user account.

In an aspect of adding the dynamic information of the promoted account to the dynamic information flow corresponding to the first user account by the platform server 120, there are the following optional adding policies:

Optionally, when the dynamic information of the promoted account needs to be added, the platform server 120 detects whether unread dynamic information of the first user account reaches a preset threshold; and if the unread dynamic information reaches the preset threshold, adds the dynamic information of the promoted account as an $n^{th}$ piece of unread dynamic information to the dynamic information flow corresponding to the first user account; or if the unread dynamic information does not reach the preset threshold, cancels the addition. The preset threshold and n are both configurable positive integers.

For example, after the platform server 120 determines the promoted account "XX Coffee" corresponding to the first user account, the platform server 120 determines whether the quantity of pieces of unread dynamic information of the first user account reaches 4, and if the quantity of pieces of the unread dynamic information of the first user account reaches 4, adds the dynamic information of the promoted account "XX Coffee" as the first piece of unread dynamic information to the dynamic information flow corresponding to the first user account, forming five pieces of unread dynamic information; or if the quantity of the unread dynamic information of the first user account does not reach 4, cancels the addition. Certainly, if other unread dynamic information is generated in a period from an addition time to an obtaining time when the user terminal obtains the dynamic information flow, the other unread dynamic information can be added in an order of a release time as the sixth piece of unread dynamic information, the seventh piece of unread dynamic information, and so on.

Optionally, when the dynamic information of the promoted account needs to be added, the platform server 120 further needs to detect whether the dynamic information of the promoted account is added to the first user account within a preset duration before a current time; and if not adding the dynamic information of the promoted account to the first user account within the preset duration before the current time, perform the addition; or if adding the dynamic information of the promoted account to the first user account within the preset duration before the current time, cancel the addition. Optionally, the preset duration is 48 hours.

The dynamic information of the promoted account can be effectively prevented from being continuously or frequently pushed to the first user account in the foregoing manner, thereby avoiding resulting in a disturbing event when the user views the dynamic information.

Optionally, the dynamic information of the foregoing promoted account is provided by the promoted account terminal 160 to the platform server in advance. The promoted account terminal 160 is logged in with the promoted account.

The promoted account terminal 160 is configured to send the dynamic information of the promoted account to the platform server 120.

The platform server 120 is configured to store the dynamic information of the promoted account.

Optionally, the platform server 120 is further configured to query existing records for account data information corresponding to the promoted account. The account data information includes the second geographic location. Optionally, the existing records include account data information entered by the promoted account in a historical registration process.

Alternatively, the platform server 120 is further configured to receive account data information sent by a promoted account client. The account data information includes the second geographic location. The promoted account client refers to a social client logged in with the promoted account.

Optionally, the promoted account terminal 160 is further configured to send at least one delivery condition of the dynamic information to the platform server 120. The delivery condition includes that the distance between the first geographic location associated with the first user account and the second geographic location is less than the preset threshold. The delivery condition may further include at least one of a gender condition, an age condition, an occupation condition, a hobby condition, a delivery time condition, a delivery time condition, or a delivery restriction condition.

The platform server 120 is configured to store the delivery condition.

It should be noted that, when sending the dynamic information, the account data information, and the delivery condition to the platform server 120, the promoted account terminal 160 may simultaneously send the three type of information, simultaneously send two type of the information, or separately send each type of the information. When each type of the information is separately sent, a sequence of a sending time of each type of the information is not limited.

According to the dynamic information presentation system provided in this embodiment, the platform server determines the matched promoted account according to the first geographic location associated with the first user account and the second geographic location associated with the promoted account, and adds the dynamic information of the promoted account to the dynamic information flow corresponding to the first user account, so that the dynamic information flow includes both the dynamic information of the second user account and the dynamic information of the promoted account. Therefore, the problem that the related art dynamic information presentation function displays only dynamic information of other users having a friendship is solved, and the dynamic information presentation function displays not only the dynamic information of the second user account, but also dynamic information of a promoted account having an association relationship with the geographic location, thereby enriching the technical effects of the presented dynamic information.

The dynamic information of the promoted account includes account information and content information. The content information includes, but is not limited to, at least one type of information of picture information, text information, voice information, video information, geographic location information, coupon information, external link information, or a promoted identifier. Optionally, at least one of the account information, the geographic location information, the coupon information, or the external link information is an interactive object.

In an optional embodiment, the account information of the promoted account in FIG. 2 is an interactive object, and the user terminal 140 and the platform server 120 further includes the following interaction process.

The user terminal 140 is configured to send a first obtaining request (or first request) to the platform server 120 when the account information of the promoted account is triggered. Optionally, the account information of the promoted account is triggered by a user by performing a tapping operation.

The platform server 120 is configured to send, according to the first obtaining request, a first page associated with the promoted account to the user terminal 140. Optionally, the first page is an account data information page of the promoted account. The account data information page includes, but is not limited to, at least one type of information of a nickname of the promoted account, an account, function introduction, an account subject, a service hotline, a business scope, or a follow control.

Correspondingly, the user terminal 140 receives the first page associated with the promoted account.

Figure 3:
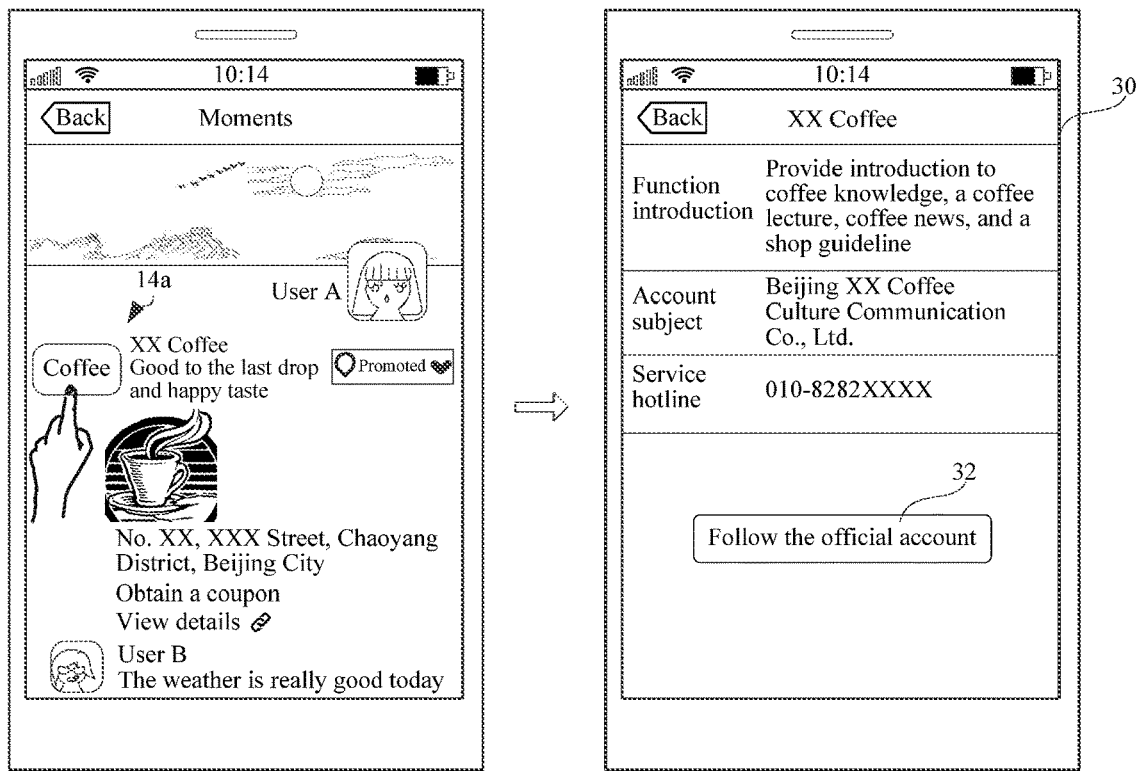
FIG. 3 is a schematic diagram of an interface when a dynamic information flow of a promoted account is triggered according to an exemplary embodiment.

Schematically referring to FIG. 3, the user terminal 140 displays the dynamic information flow corresponding to the first user account "User A". The dynamic information flow includes the dynamic information 14 of the promoted account "XX Coffee". After a profile photo or a nickname 14a of the promoted account "XX Coffee" is tapped, the user terminal 140 obtains an account data information page 30 associated with the promoted account "XX Coffee" from the platform server 120 and displays the page 30. The account data information page 30 includes function introduction to the promoted account "XX Coffee", an account subject, a service hotline, and a follow/subscribe control 32.

The user terminal 140 is further configured to send an account follow request to the platform server 120 after the follow control in the first page is triggered. The account follow request is used for requesting following the promoted account. Optionally, the account follow request carries the promoted account.

The platform server 120 is configured to establish a follow relationship between the first user account and the promoted account after receiving the account follow request. That is, the first user account follows the promoted account.

In this embodiment, the first page is presented after the account information of the promoted account is triggered, so that the account data information associated with the promoted account is provided in the dynamic information flow corresponding to the first user account, and a user corresponding to the first user account is enabled to conveniently learn of account data of the promoted account. When the first page includes the follow control, the user corresponding to the first user account may further conveniently follow the promoted account, thereby increasing the probability that the promoted account is followed.

In an optional embodiment, the geographic location information in FIG. 2 is an interactive object, for example, a link class object. In this case, the user terminal 120 and the platform server 140 further includes the following interaction process.

The user terminal 140 is configured to send a second obtaining request (or second request) to the platform server 120 when the geographic location information is triggered. Optionally, the geographic location information is triggered by a user by performing a tapping operation.

The platform server 120 is configured to send, according to the second obtaining request, a second page associated with the geographic location information to the user terminal 140. Optionally, the second page is a POI information page of the geographic location information. The POI information page includes, but is not limited to, at least one type of information of a name, an address, map information, a navigation control, a telephone, a collection of pictures, business hours, a recommended item, or feature introduction.

Correspondingly, the user terminal 140 receives the second page associated with the geographic location information.

Figure 4:
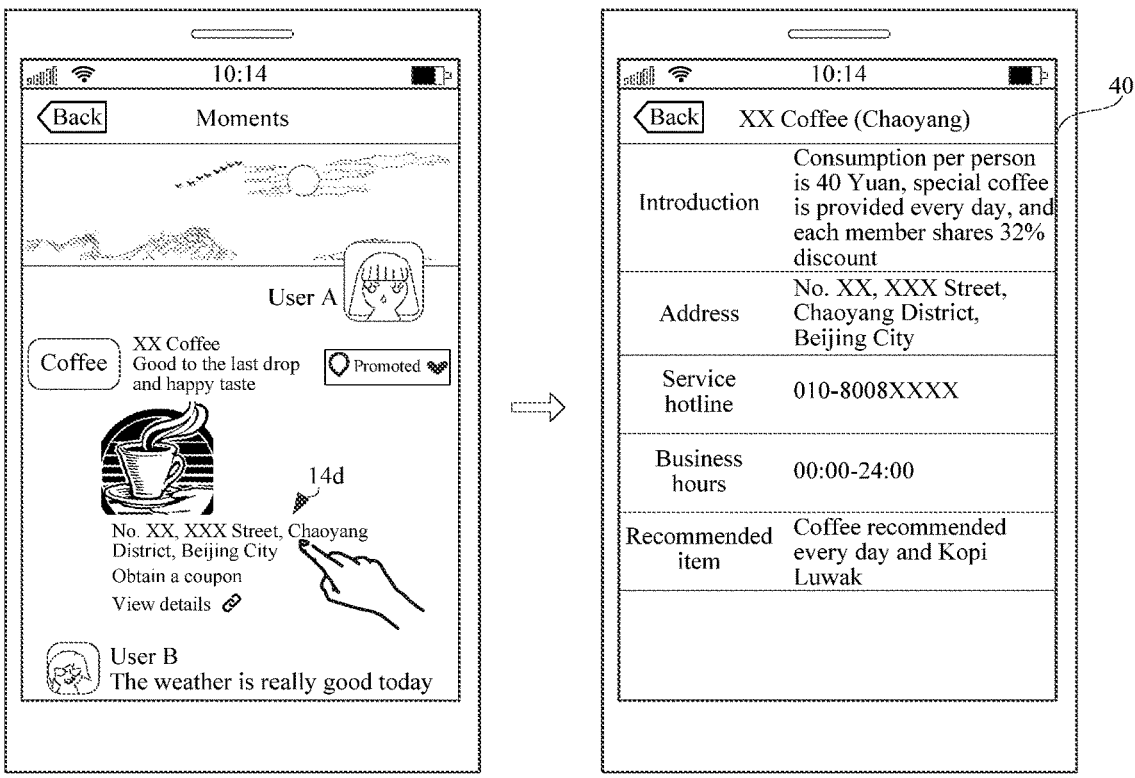
FIG. 4 is a schematic diagram of an interface when a dynamic information flow of a promoted account is triggered according to another exemplary embodiment.

Schematically referring to FIG. 4, the user terminal 140 displays the dynamic information flow corresponding to the first user account "User A". The dynamic information flow includes geographic location information 14d "No. XX, XXX Street, Chaoyang District, Beijing City". After the geographic location information 14d is tapped, the user terminal 140 obtains a POI information page 40 of the geographic location information 14d from the platform server 120 and displays the page 40. The POI information page 40 includes a name, an address, a service hotline, business hours, and a recommended item that are of the POI point.

Optionally, the navigation control is a navigation button hovering above the POI information page.

The user terminal 140 is further configured to send a navigation request when the navigation control is triggered. The navigation request is used for requesting navigation information in which the second geographic location is a destination.

The platform server 120 is further configured to: receive the navigation request, generate navigation information according to the navigation request, and send the navigation information to the user terminal 140.

Correspondingly, the user terminal 140 receives the navigation information.

In this embodiment, the second page is presented after the geographic location information is triggered, so that the POI information page associated with the geographic location information is provided in the dynamic information flow corresponding to the first user account, and a user corresponding to the first user account is enabled to conveniently learn of POI information corresponding to the second geographic location. It should be noted that, one promoted account may associate with multiple pieces of POI information (for example, multiple divisions of a same brand), POI information corresponding to each piece of dynamic information corresponding to the promoted account may be different, and the second page provides an obtaining path related to the POI information.

The second page may further provide the navigation control. The user corresponding to the first user account can conveniently search the real society for a brick-and-mortar shop, agency, or house.

In an optional embodiment, the coupon information in FIG. 2 is an interactive object, for example, a link class object. In this case, the user terminal 120 and the platform server 140 further includes the following interaction process.

The user terminal 140 is configured to send a third obtaining request (or third request) to the platform server 120 when the coupon information is triggered. Optionally, the coupon information is triggered by a user by performing a tapping operation.

The platform server 120 is configured to send, according to the third obtaining request, a third page associated with the coupon information to the user terminal 140. Optionally, the third page is a coupon obtaining page. The coupon obtaining page includes, but is not limited to, at least one type of information of a coupon category, a coupon validity period, introduction information of a coupon obtaining manner, or a coupon obtaining control.

Correspondingly, the user terminal 140 receives the third page associated with the coupon information.

Figure 5:
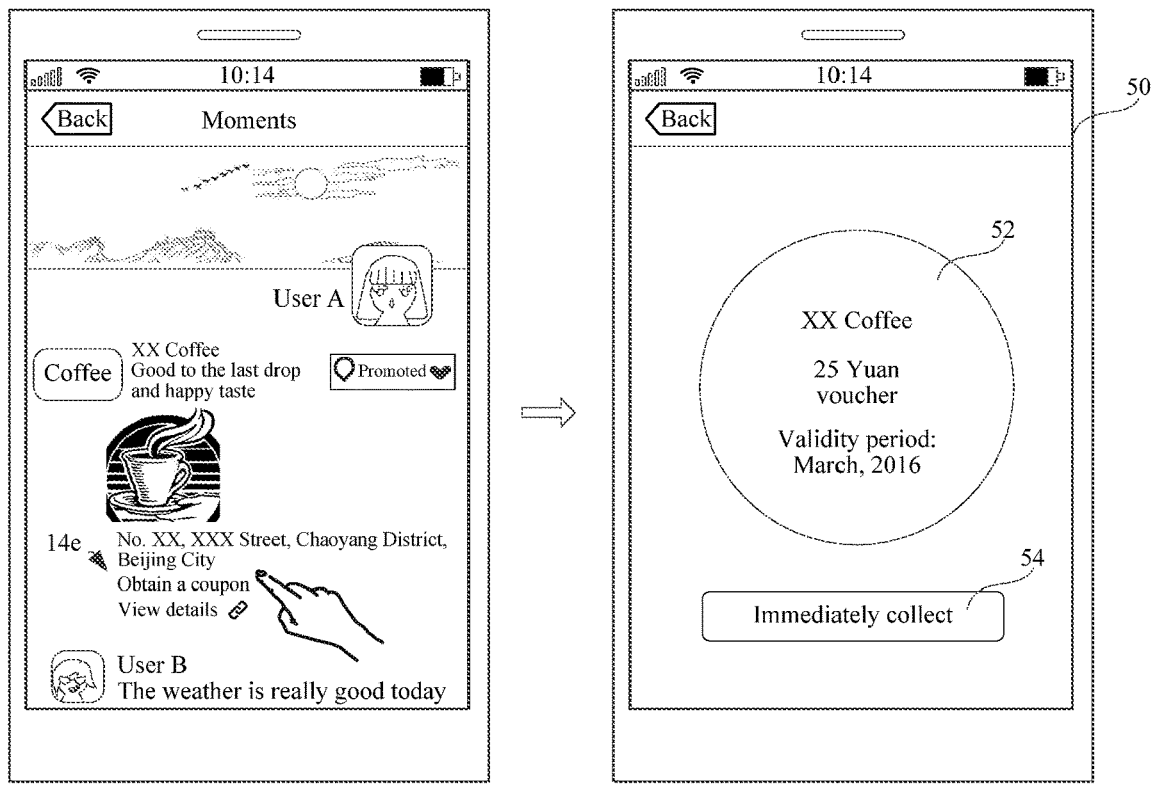
FIG. 5 is a schematic diagram of an interface when a dynamic information flow of a promoted account is triggered according to another exemplary embodiment.

Schematically referring to FIG. 5, the user terminal 140 displays the dynamic information flow corresponding to the first user account "User A". The dynamic information flow includes coupon information 14e "Obtain a coupon". When the coupon information 14e "Obtain a coupon" is tapped, the user terminal 140 obtains an obtaining page 50 of the coupon information 14e "Obtain a coupon" from the platform server 120 and displays the page 50. The obtaining page 50 includes introduction information 52 of 25 Yuan voucher and an obtaining control 54.

The user terminal 140 is further configured to send a coupon obtaining request (or coupon request) to the platform server 120 after the coupon obtaining control in the third page is triggered. The coupon obtaining request is used for obtaining a discount card or a coupon related to the promoted account.

The platform server 120 is configured to send an electronic coupon to the user terminal 140 according to the coupon obtaining request. Correspondingly, the user terminal 140 receives the electronic coupon related with the promoted account.

In this embodiment, the third page is presented after the coupon information is triggered, so that the coupon obtaining page is provided in the dynamic information flow corresponding to the first user account, thereby providing a new coupon obtaining path for a user corresponding to the first user account. Compared with a traditional coupon obtaining path, by using the coupon obtaining path provided in this embodiment, effective users can be reached, thereby increasing a success rate of issuing coupons, and reducing waste of a server resource when coupons are issued.

In an optional embodiment, the external link information in FIG. 2 is an interactive object, for example, a link class object. A link to which the external link information points may be customized by a management party of the promoted account. In this case, the user terminal 120 and the platform server 140 further includes the following interaction process.

The user terminal 140 is configured to send a fourth obtaining request (or fourth request) to the platform server 120 when the external link information is triggered. Optionally, the external link information is triggered by a user by performing a tapping operation.

The platform server 120 is configured to send, according to the fourth obtaining request, a fourth page associated with the external link information to the user terminal 140. Optionally, the fourth page is a web page specified by the management party of the promoted account. Page content of the fourth page is not limited in this embodiment.

Figure 6:
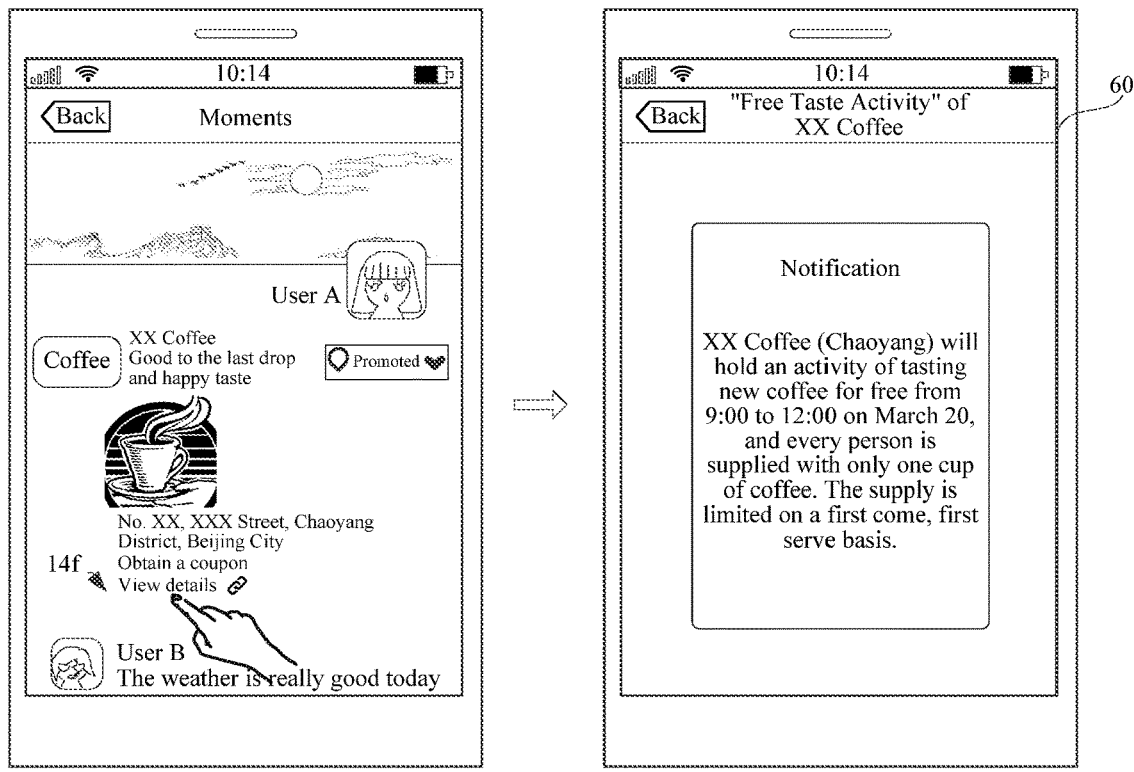
FIG. 6 is a schematic diagram of an interface when a dynamic information flow of a promoted account is triggered according to another exemplary embodiment.

Schematically referring to FIG. 6, the user terminal 140 displays the dynamic information flow corresponding to the first user account "User A". The dynamic information flow includes external link information 14f. After the external link information 14f is tapped, the user terminal 140 obtains an activity introduction page 60 to which the external link information 14f points from the platform server 120 and displays the page 60. The activity introduction page 60 includes introduction that the promoted account "XX Coffee" holds an activity of tasting coffee for free on DD/MM.

It should be noted that, because the fourth page may be customized by the management party of the promoted account, a specific form of the fourth page associated with the external link information is not limited in this embodiment. The fourth page may be a page for activity promotion, a page for following the promoted account, a page for collecting a coupon, a page for downloading an Application (APP), a page for lot drawing, or a game page, and so on. Details are not described.

In this embodiment, the fourth page is presented after the external link information is triggered, so that the page specified by the management party of the promoted account is provided in the dynamic information flow corresponding to the first user account, thereby enriching types of information provided by the dynamic information flow.

In an optional embodiment, the promoted identifier in FIG. 2 is an interactive object. The promoted identifier includes a typeface of "Promotion" and a reject control. In this case, the user terminal 120 and the platform server 140 further includes the following interaction process.

The user terminal 140 is configured to send a cancellation request to the platform server 120 when the reject control in the promoted identifier is triggered. Optionally, the reject control in the promoted identifier is triggered by a user by performing a tapping operation.

The platform server 120 is configured to delete the dynamic information of the promoted account from the dynamic information flow corresponding to the first user account according to the cancellation request.

Figure 7:
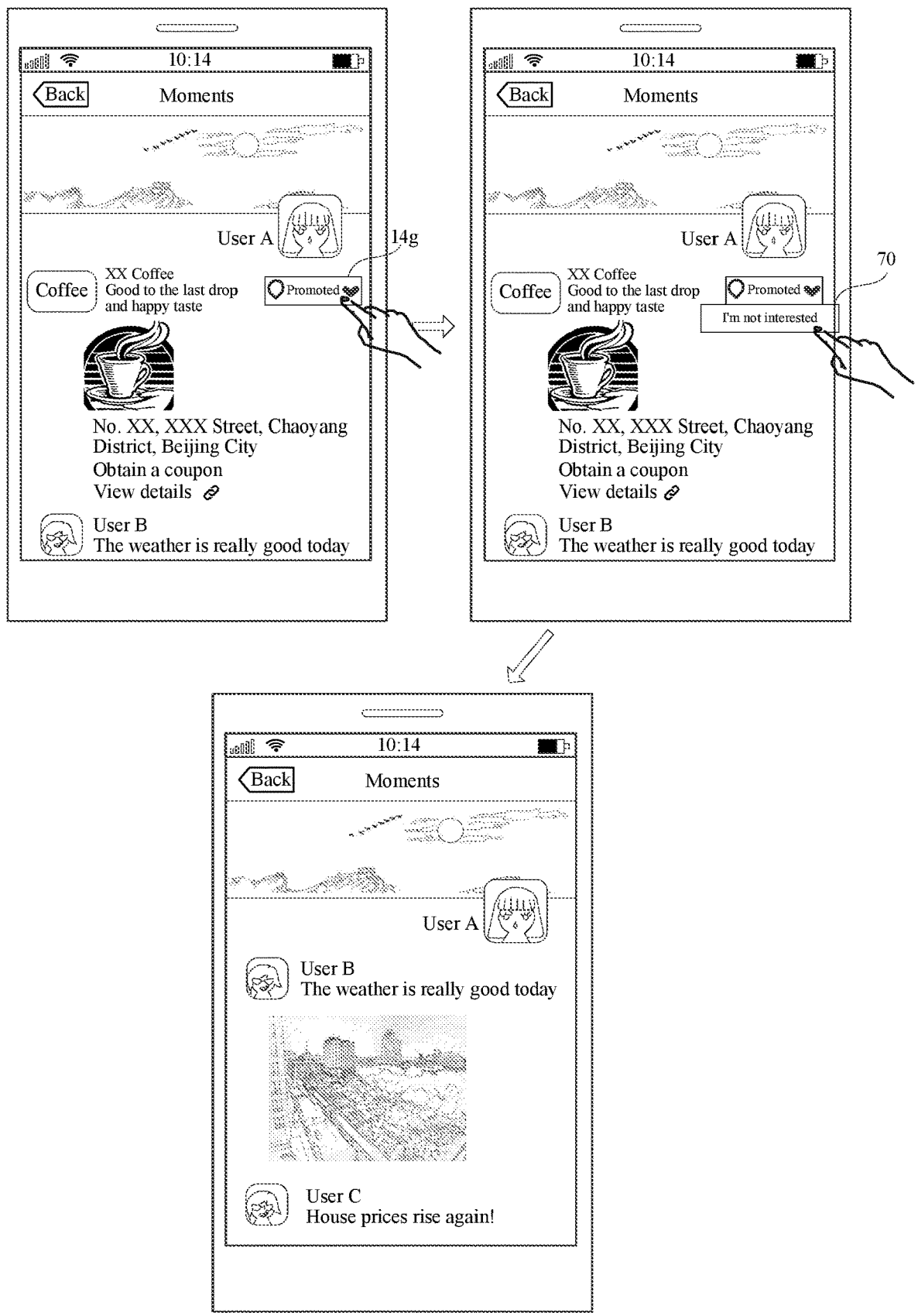
FIG. 7 is a schematic diagram of an interface when a dynamic information flow of a promoted account is triggered according to another exemplary embodiment.

Schematically referring to FIG. 7, the user terminal 140 displays the dynamic information flow corresponding to the first user account "User A". The dynamic information flow includes a promoted identifier 14g. After the promoted identifier 14g is tapped, a reject control 70 is displayed. After the reject control is tapped, the user terminal 140 sends a cancellation request to the platform server 120. The platform server 120 deletes the dynamic information of the promoted account "XX Coffee" from the dynamic information flow corresponding to the first user account. The user terminal 140 also cancels displaying the dynamic information of the promoted account "XX Coffee" in the dynamic information flow corresponding to the first user account.

In this embodiment, the reject control is provided, to prevent the user from being frequently disturbed.

Figure 8:
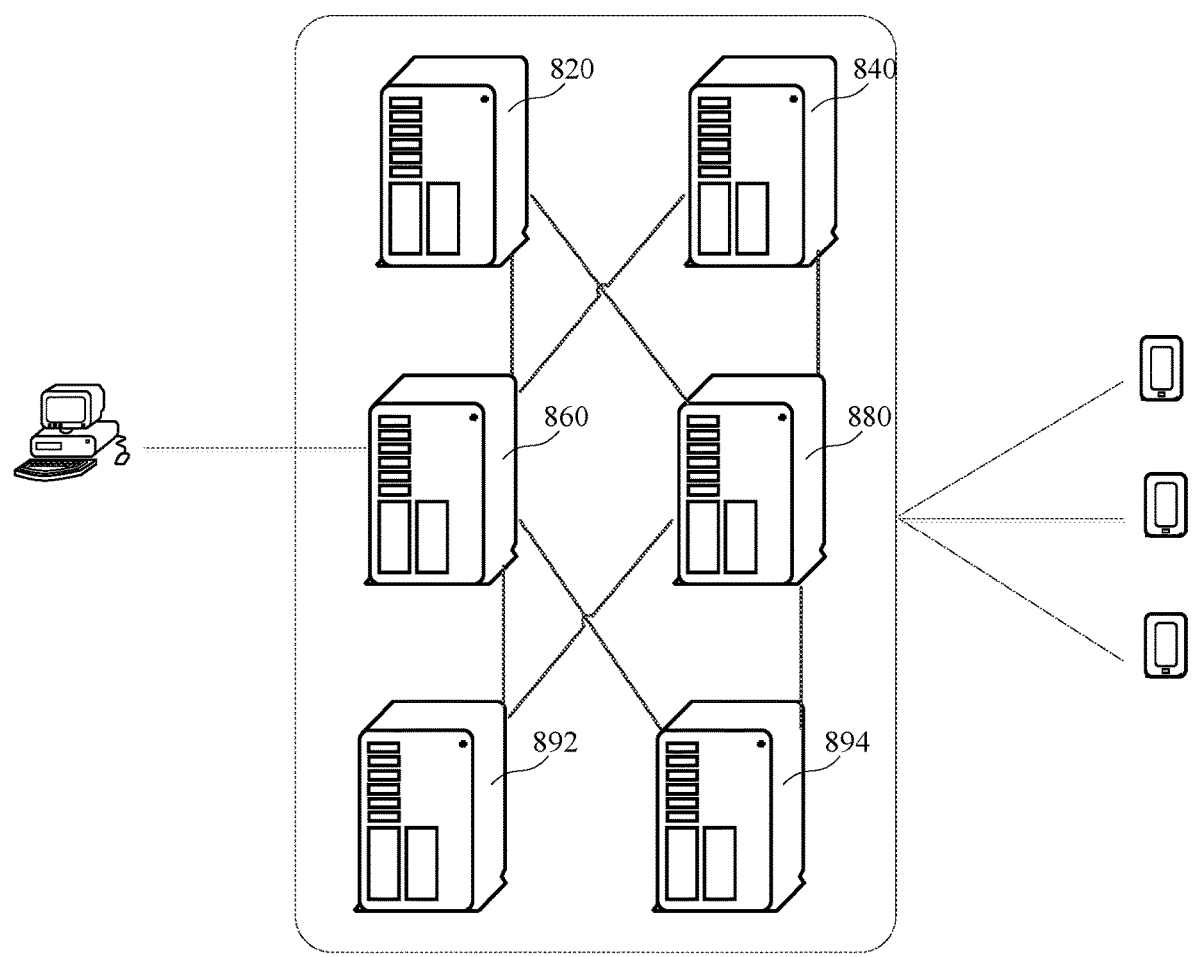
FIG. 8 is an architectural diagram of a platform server according to another exemplary embodiment.

FIG. 8 is an architectural diagram of a platform server according to another exemplary embodiment. In this embodiment, the platform server adopts a cluster architecture. The platform server includes a user account management server 820, a promoted account management server 840, a dynamic information delivery server 860, a dynamic information addition server 880, a POI information management server 892, and a coupon information management server 894.

The user account management server 820 is configured to store and manage account data of each user account and a social relationship chain of each user account.

The promoted account management server 840 is configured to store and manage account data of each promoted account.

The dynamic information delivery server 860 is configured to store and manage dynamic information of each promoted account that needs to be presented and a delivery condition.

The dynamic information addition server 880 is configured to: obtain a first geographic location associated with a first user account, determine a promoted account matching the first user account according to the first geographic location, the promoted account corresponding to a second geographic location, adds dynamic information of the promoted account to a dynamic information flow corresponding to the first user account, and provide the dynamic information flow for a user terminal logged in with the first user account.

The POI information management server 892 is configured to manage POI information of each promoted account.

The coupon information management server 894 is configured to manage a coupon issued by each promoted account and/or a coupon collected by each user account.

It should be noted that, a function division manner of each server in the platform server is not limited in this embodiment. A division manner different from that shown in FIG. 8 may alternatively be used.

Figure 9:
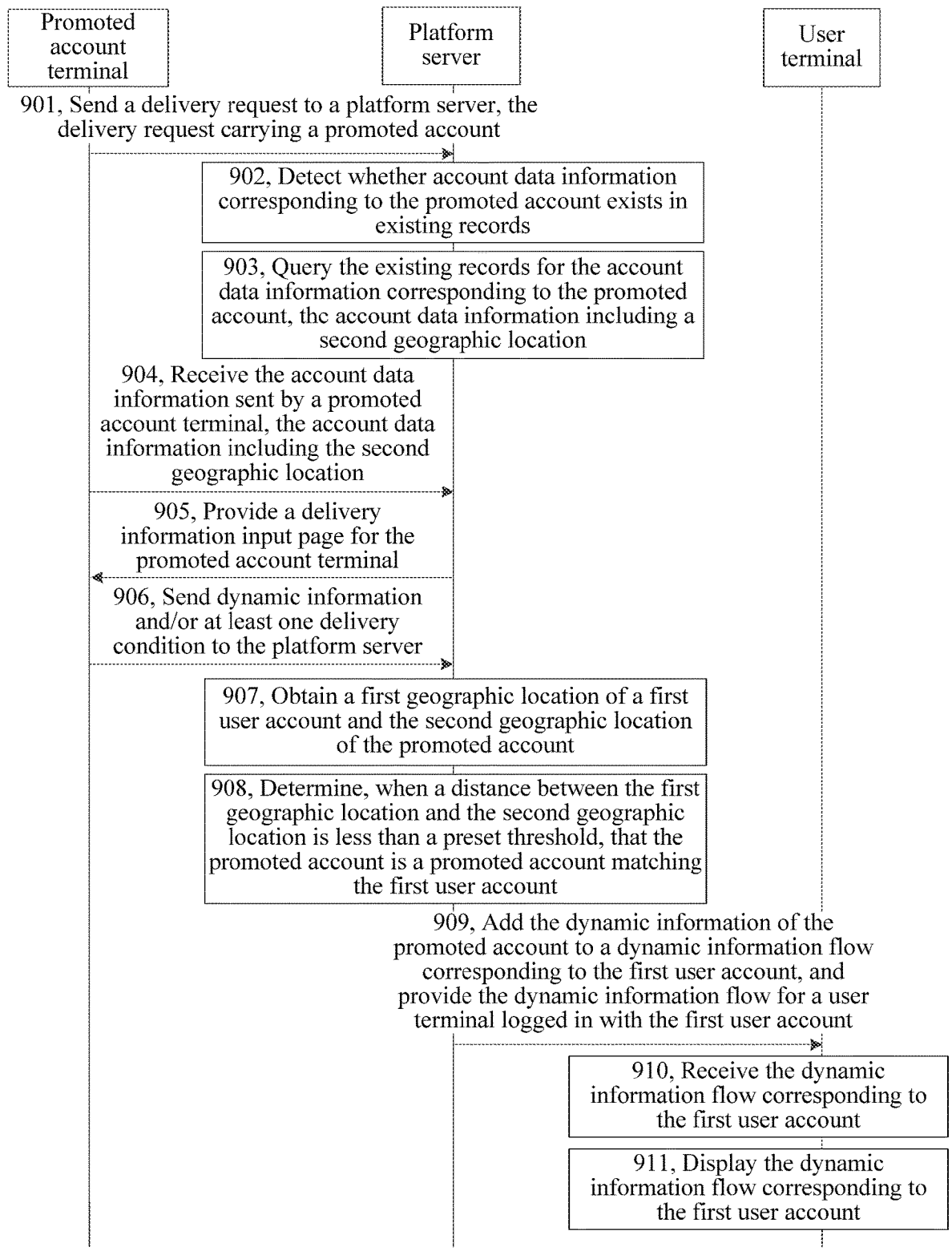
FIG. 9 is a method flowchart of a dynamic information presentation method according to an exemplary embodiment.

FIG. 9 is a method flowchart of a dynamic information presentation method according to an exemplary embodiment. This embodiment is described by using an example in which the dynamic information presentation method is applied to the system shown in FIG. 1 and the platform server shown in FIG. 8. The method includes the following steps.

Step 901: A promoted account terminal sends a delivery request to the platform server, the delivery request carrying a promoted account.

Optionally, the promoted account terminal sends the delivery request to the dynamic information delivery server 860, the delivery request carrying the promoted account.

Step 902: The platform server detects whether account data information corresponding to the promoted account exists in existing records.

Optionally, the dynamic information delivery server 860 initiates an query request to the promoted account management server 840, the query request carrying the promoted account. The promoted account management server 840 detects whether the account data information corresponding to the promoted account exists in the existing records.

If the account data information corresponding to the promoted account exists, the process turns to step 903.

If the account data information corresponding to the promoted account does not exist, the process turns to step 904.

Step 903: The platform server queries the existing records for the account data information corresponding to the promoted account, the account data information including a second geographic location.

If the account data information corresponding to the promoted account exists in the promoted account management server 840, the promoted account management server 840 feeds the queried account data information back to the dynamic information delivery server 860.

Step 904: The platform server receives the account data information sent by the promoted account terminal, the account data information including the second geographic location.

If the account data information corresponding to the promoted account does not exist in the promoted account management server 840, the dynamic information delivery server 860 guides the promoted account terminal to create the account data information on the promoted account management server 840, and the promoted account management server 840 receives the account data information sent by the promoted account terminal, the account data information including the second geographic location.

Step 905: The platform server provides a delivery information input page for the promoted account terminal.

Optionally, the delivery information input page includes the account data information corresponding to the promoted account.

Optionally, the delivery information input page further includes an input control of dynamic information and/or an input control of a delivery condition.

Step 906: The promoted account terminal sends dynamic information and/or at least one delivery condition to the platform server.

After the dynamic information delivery server 860 provides the delivery information input page for the promoted account terminal, a delivery party inputs the dynamic information and/or the at least one delivery condition in the delivery information input page.

Then, the promoted account terminal sends the dynamic information and/or the at least one delivery condition to the dynamic information delivery server 860.

Correspondingly, the dynamic information delivery server 860 stores the dynamic information corresponding to the promoted account and/or the at least one delivery condition.

Step 907: The platform server obtains a first geographic location associated with a first user account and the second geographic location associated with the promoted account.

Optionally, the user account management server 820 obtains the first geographic location by using historical data of the first user account. Alternatively, the user account management server 820 receives the first geographic location reported by a user terminal. The dynamic information addition server 880 obtains the first geographic location associated with the first user account from the user account management server 820.

Optionally, the dynamic information addition server 880 obtains the second geographic location corresponding to the promoted account from the promoted account management server 840.

It should be noted that, this step may be divided into two steps that are separately performed in an order.

Step 908: The platform server determines, when a distance between the first geographic location and the second geographic location is less than a preset threshold, that the promoted account is a promoted account matching the first user account.

Step 908: The dynamic information addition server 880 determines, when the distance between the first geographic location and the second geographic location is less than the preset threshold, that the promoted account is the promoted account matching the first user account.

Optionally, when another delivery condition exists, the dynamic information addition server 880 further obtains other data information of the first user account from the user account management server 820, and obtains the another delivery condition from the dynamic information delivery server 860. When the other data information of the first user account satisfies the another delivery condition, the dynamic information addition server 880 determines that the promoted account is the promoted account matching the first user account.

For example, delivery conditions corresponding to the promoted account include that a distance between the first geographic location and a second geographic location "place D" is less than 1000 meters, and the gender is female. The dynamic information addition server 880 is configured to: detect whether the distance between the first geographic location associated with the first user account and the second geographic location "place D" is less than 1000 meters, and detect whether the gender corresponding to the first user account is female; and if detection results are that the distance is less than 1000 meters and the gender is female, determine that the promoted account is the promoted account corresponding to the first user account.

Step 909: The platform server adds the dynamic information of the promoted account to a dynamic information flow corresponding to the first user account, and provides the dynamic information flow for the user terminal logged in with the first user account.

The dynamic information addition server 880 obtains the dynamic information of the promoted account from the dynamic information delivery server 860, and adds the dynamic information of the promoted account to the dynamic information flow corresponding to the first user account. When the user terminal requests the dynamic information flow corresponding to the first user account, the dynamic information addition server 880 provides the dynamic information flow for the user terminal.

The dynamic information flow is an information flow for presenting dynamic information of a second user account, the second user account having a social relationship with the first user account.

Optionally, the dynamic information of the promoted account includes account information and content information. The content information includes at least one type of information of picture information, text information, voice information, video information, geographic location information, coupon information, external link information, or a promoted identifier.

Optionally, when the dynamic information of the promoted account needs to be added, the dynamic information addition server 880 detects whether unread dynamic information of the first user account reaches a preset threshold; and if the unread dynamic information reaches the preset threshold, adds the dynamic information of the promoted account as an $n^{th}$ piece of unread dynamic information to the dynamic information flow corresponding to the first user account; or if the unread dynamic information does not reach the preset threshold, cancels the addition. The preset threshold and n are both configurable positive integers.

Optionally, when the dynamic information of the promoted account needs to be added, the dynamic information addition server 880 further needs to detect whether the dynamic information of the promoted account is added to the first user account within a preset duration before a current time; and if the dynamic information of the promoted account is not added to the first user account within the preset duration before the current time, perform the addition; or if the dynamic information of the promoted account is added to the first user account within the preset duration before the current time, cancel the addition. Optionally, the preset duration is 48 hours.

Step 910: The user terminal receives the dynamic information flow corresponding to the first user account.

The dynamic information flow corresponding to the first user account includes not only the dynamic information of the second user account, but also the dynamic information of the promoted account. The second user account has the social relationship with the first user account. The promoted account corresponds to the second geographic location.

Step 911: The user terminal displays the dynamic information flow corresponding to the first user account.

According to the dynamic information presentation method provided in this embodiment, the platform server determines the matched promoted account according to the first geographic location associated with the first user account and the second geographic location associated with the promoted account, and adds the dynamic information of the promoted account to the dynamic information flow corresponding to the first user account, so that the dynamic information flow includes both the dynamic information of the second user account and the dynamic information of the promoted account, the problem that the related art dynamic information presentation function displays only dynamic information of other users having a friendship is solved, and the dynamic information presentation function displays not only the dynamic information of the second user account, but also dynamic information of a promoted account having an association relationship with the geographic location.

In an optional embodiment, the quantity of candidate promoted accounts that match the first geographic location and that are determined by the dynamic information addition server 880 is two or more. The dynamic information addition server 880 sorts the two or more candidate promoted accounts according to interaction intimacy of the second user account with the dynamic information of the promoted account, and selects the candidate promoted account sorted the top as the promoted account matching the first user account.

Schematically, the interaction intimacy is represented by using an interaction frequency and/or interaction times of an interaction operation, the interaction operation including "Comment" or "Like". Because the dynamic information of the promoted account may have been added to dynamic information flows corresponding to some second user accounts, and the second user accounts perform interaction with the promoted account in a "Comment" or "Like" manner, the dynamic information addition server 880 is configured to: calculate the interaction intimacy of the second user accounts with the dynamic information of the promoted account according to interaction times or interaction frequencies of the second user accounts, and sort the promoted account based on the interaction intimacy.

Figure 10:
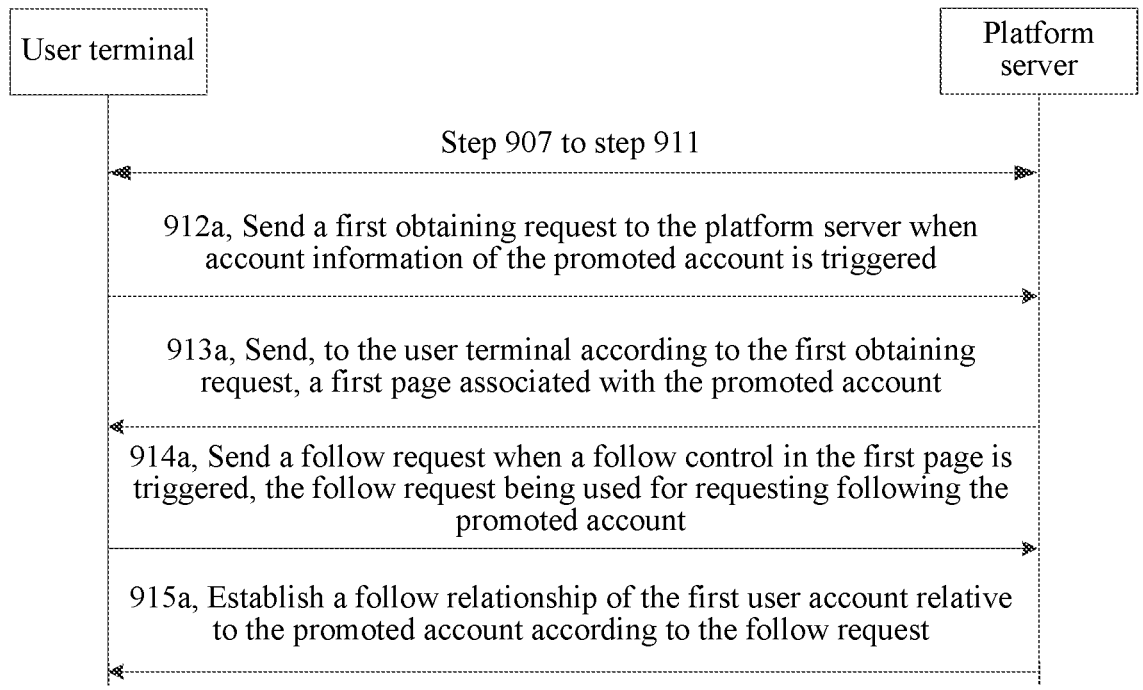
FIG. 10 is a method flowchart of a dynamic information presentation method according to another exemplary embodiment.

Optionally, after step 911 in the foregoing embodiment, the method further includes the following steps, as shown in FIG. 10.

Step 912a: The user terminal sends a first obtaining request to the platform server when account information of the promoted account is triggered.

Optionally, the account information of the promoted account is triggered by a user by performing a tapping operation.

Step 913a: The platform server sends, to the user terminal according to the first obtaining request, a first page associated with the promoted account.

Optionally, the first page is an account data information page of the promoted account. The account data information page includes, but is not limited to, at least one type of information of a nickname of the promoted account, an account, function introduction, an account subject, a service hotline, a business scope, or a follow control.

Step 914a: The user terminal sends a follow request when a follow control in the first page is triggered, the follow request being used for requesting following the promoted account.

Step 915a: The platform server establishes a follow relationship of the first user account relative to the promoted account according to the follow request. The follow relationship may also be referred to as a subscription relationship.

Figure 11:
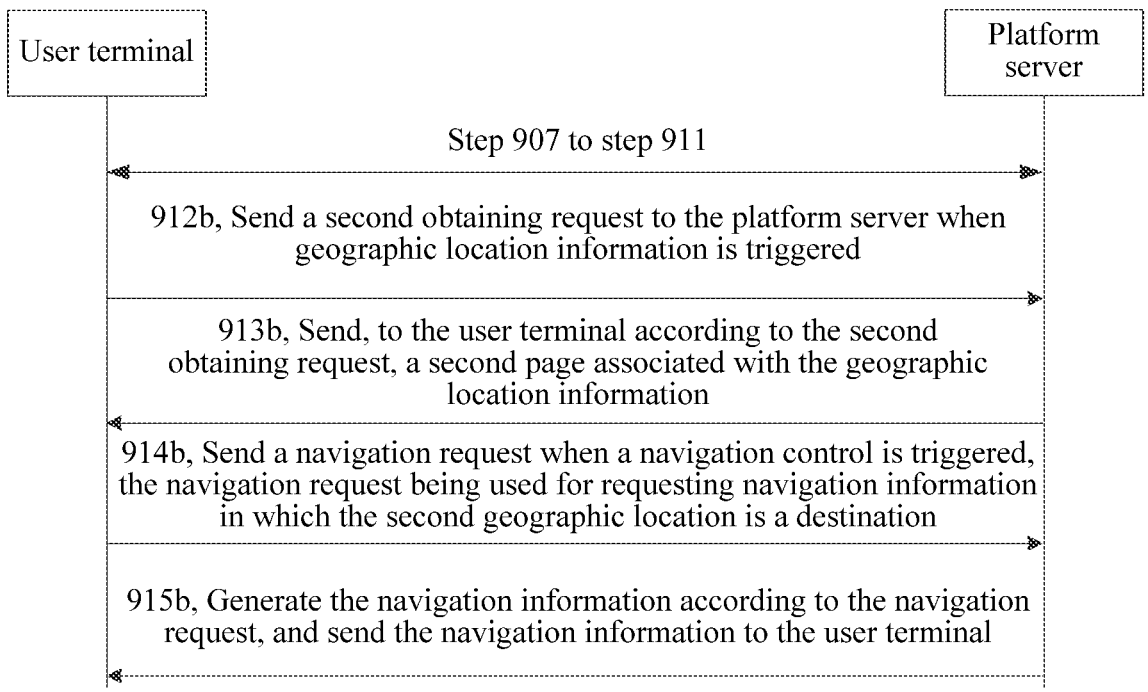
FIG. 11 is a method flowchart of a dynamic information presentation method according to another exemplary embodiment.

Optionally, after step 911 in the foregoing embodiment, the method further includes the following steps, as shown in FIG. 11.

Step 912b: The user terminal sends a second obtaining request to the platform server when geographic location information is triggered.

Optionally, the geographic location information is triggered by a user by performing a tapping operation.

Step 913b: The platform server sends, to the user terminal according to the second obtaining request, a second page associated with the geographic location information.

Optionally, after receiving the second obtaining request, the POI information management server 992 sends the second page associated with the geographic location information to the user terminal.

Optionally, the second page is a POI information page of the geographic location information. The POI information page includes, but is not limited to, at least one type of information of a name, an address, map information, a navigation control, a telephone, a collection of pictures, business hours, a recommended item, or feature introduction.

Step 914b: The user terminal sends a navigation request when a navigation control is triggered, the navigation request being used for requesting navigation information in which the second geographic location is a destination.

Step 915b: The platform server generates the navigation information according to the navigation request, and sends the navigation information to the user terminal.

Correspondingly, the user terminal receives the navigation information and displays or plays the navigation information.

Figure 12:
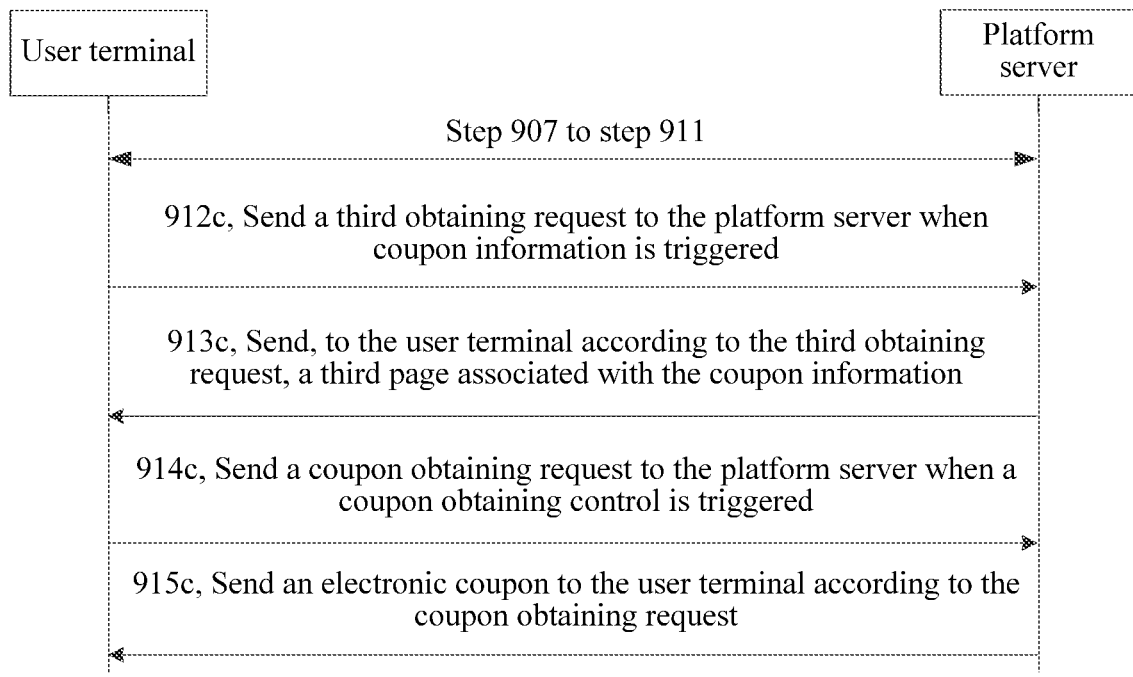
FIG. 12 is a method flowchart of a dynamic information presentation method according to another exemplary embodiment.

Optionally, after step 911 in the foregoing embodiment, the method further includes the following steps, as shown in FIG. 12.

Step 912c: The user terminal sends a third obtaining request to the platform server when coupon information is triggered.

Optionally, the coupon information is triggered by a user by performing a tapping operation.

Step 913c: The platform server sends, to the user terminal according to the third obtaining request, a third page associated with the coupon information.

Optionally, after receiving the third obtaining request, the coupon information management server 994 sends the third page associated with the coupon information to the user terminal.

Optionally, the third page is a coupon obtaining page. The coupon obtaining page includes, but is not limited to, at least one type of information of a coupon category, a coupon validity period, introduction information of a coupon obtaining manner, or a coupon obtaining control.

Step 914c: The user terminal sends a coupon obtaining request to the platform server when a coupon obtaining control is triggered.

Step 915c: The platform server sends an electronic coupon to the user terminal according to the coupon obtaining request.

Correspondingly, the user terminal receives and stores the electronic coupon. Optionally, the user terminal stores the electronic coupon in a coupon management item associated with the first user account.

Figure 13:
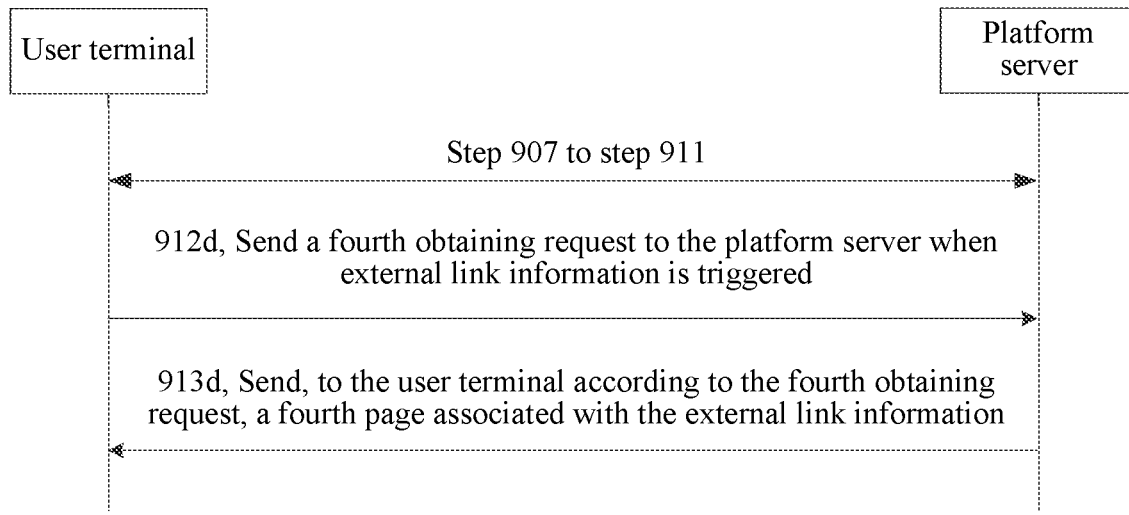
FIG. 13 is a method flowchart of a dynamic information presentation method according to another exemplary embodiment.

Optionally, after step 911 in the foregoing embodiment, the method further includes the following steps, as shown in FIG. 13.

Step 912d: The user terminal sends a fourth obtaining request to the platform server when external link information is triggered.

Optionally, the external link information is triggered by a user by performing a tapping operation.

Step 913d: The platform server sends, to the user terminal according to the fourth obtaining request, a fourth page associated with the external link information.

Optionally, after receiving the fourth obtaining request, the dynamic information addition server 980 sends the fourth page to the user terminal according to a link to which the external link information points. Alternatively, a web page server of a link to which the external link information points receives the fourth obtaining request, and sends the fourth page associated with the external link information to the user terminal.

Optionally, the fourth page is a page specified by the promoted account.

Figure 14:
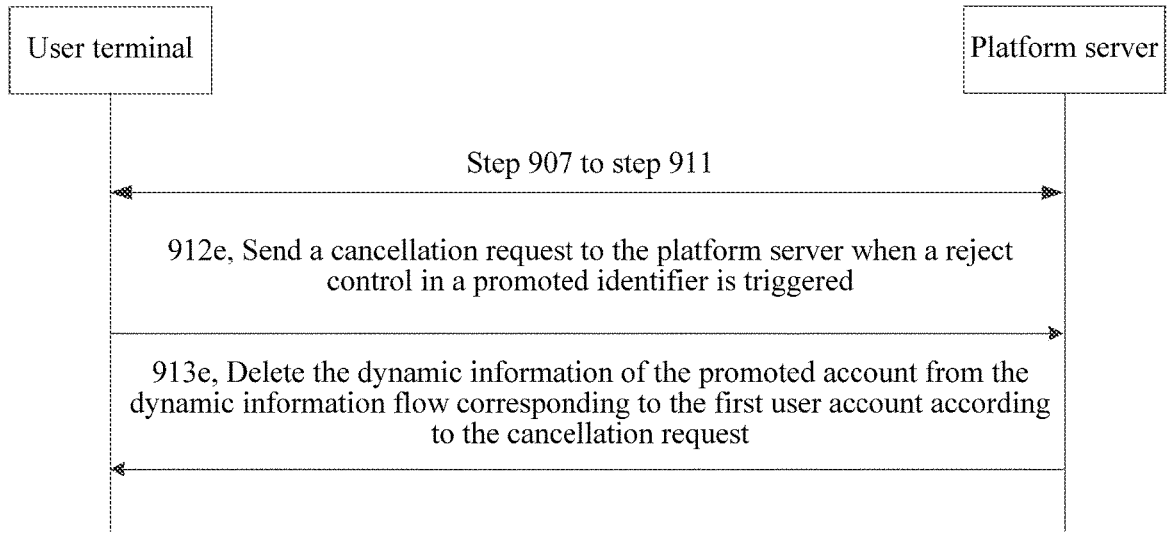
FIG. 14 is a method flowchart of a dynamic information presentation method according to another exemplary embodiment.

Optionally, after step 911 in the foregoing embodiment, the method further includes the following steps, as shown in FIG. 14.

Step 912e: The user terminal sends a cancellation request to the platform server when a reject control in a promoted identifier is triggered.

Optionally, the reject control in the promoted identifier is triggered by a user by performing a tapping operation.

Optionally, the external link information is triggered by a user by performing a tapping operation.

Step 913e: The platform server deletes the dynamic information of the promoted account from the dynamic information flow corresponding to the first user account according to the cancellation request.

Optionally, after receiving the cancellation request, the dynamic information addition server deletes the dynamic information of the promoted account from the dynamic information flow corresponding to the first user account.

The user terminal also cancels displaying the dynamic information of the promoted account in the dynamic information flow corresponding to the first user account.

Optionally, the dynamic information addition server further updates a delivery condition corresponding to the first user account according to the rejected promoted account, for example, no longer adds a same type of promoted account for the first user account in a subsequent process.

In this embodiment, the reject control is provided, to prevent the user from being frequently disturbed.

It should be noted that, in the foregoing method embodiments, steps performed by the user terminal may be individually implemented to become the dynamic information presentation method of the user terminal side, steps performed by the platform server may be individually implemented to become a dynamic information sending method of the platform server side, and steps performed by the promoted account terminal may be individually implemented to become a dynamic information delivery method of the promoted account terminal side.

Figure 15:
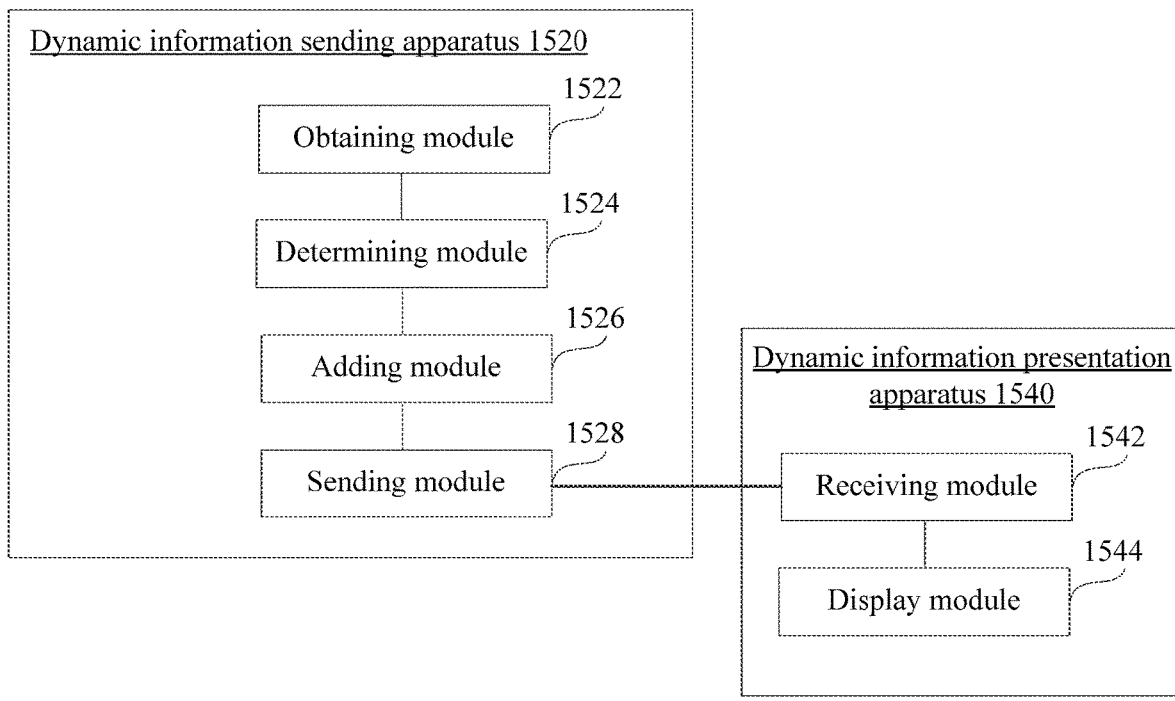
FIG. 15 is a structural block diagram of a dynamic information presentation system according to another exemplary embodiment.

FIG. 15 is a structural block diagram of a dynamic information presentation system according to another exemplary embodiment. The dynamic information presentation system includes a dynamic information sending apparatus 1520 and a dynamic information presentation apparatus 1540. The dynamic information sending apparatus 1520 may become all or a part of a platform server by using software, hardware, or a combination thereof. The dynamic information presentation apparatus 1540 may become all or a part of a user terminal by using software, hardware, or a combination thereof.

The dynamic information sending apparatus 1520 includes:

an obtaining module 1522, configured to obtain a first geographic location associated with a first user account;

a determining module 1524, configured to determine, according to the first geographic location, a promoted account matching the first user account, the promoted account corresponding to a second geographic location;

an adding module 1526, configured to add dynamic information of the promoted account to a dynamic information flow corresponding to the first user account, the dynamic information flow being an information flow for presenting dynamic information of a second user account, and the second user account having a social relationship with the first user account; and a sending module 1528, configured to send the dynamic information flow to a user terminal logged in with the first user account.

Optionally, the dynamic information of the promoted account includes account information and content information.

The content information includes at least one type of information of picture information, text information, voice information, video information, geographic location information, coupon information, external link information, or a promoted identifier.

Optionally, the obtaining module 1522 is further configured to obtain the first geographic location by using historical data of the first user account. Alternatively, the obtaining module 1522 is further configured to receive the first geographic location reported by the user terminal.

Optionally, the obtaining module 1522 is further configured to obtain the second geographic location corresponding to the promoted account. The adding module 1526 is configured to determine, when a distance between the first geographic location and the second geographic location is less than a preset threshold, that the promoted account is the promoted account matching the first user account.

Optionally, the adding module 1526 is configured to: when the quantity of candidate promoted accounts matching the first user account is two or more, sort the candidate promoted accounts according to interaction intimacy of the second user account with dynamic information of the candidate promoted accounts, and determine that the candidate promoted account sorted on the top is the promoted account matching the first user account.

Optionally, the dynamic information sending apparatus 1520 further includes a receiving module and a storage module (not shown in the figure). The receiving module is configured to receive the dynamic information of the promoted account that is sent by a promoted account terminal. The storage module is configured to store the dynamic information of the promoted account.

Optionally, the obtaining module 1522 is configured to query existing records for the account data information corresponding to the promoted account, the account data information including the second geographic location. Alternatively, the receiving module is further configured to receive the account data information sent by the promoted account terminal, the account data information including the second geographic location.

Optionally, the dynamic information sending apparatus 1520 further includes a response module (not shown in the figure).

The receiving module is configured to receive a first obtaining request, the first obtaining request being sent by the user terminal when the account information is triggered. The response module is configured to send, to the user terminal according to the first obtaining request, a first page associated with the promoted account. The receiving module is further configured to receive a follow request sent by the user terminal. The response module is further configured to establish a follow relationship between the first user account and the promoted account according to the follow relationship.

Optionally, the receiving module is configured to receive a second obtaining request, the second obtaining request being sent by the user terminal when the geographic location information is triggered. The response module is configured to send, to the user terminal according to the second obtaining request, a second page associated with the geographic location information. The receiving module is further configured to receive a navigation request sent by the user terminal, the navigation request being used for requesting navigation information in which the second geographic location is a destination. The response module is configured to generate the navigation information according to the navigation request. The sending module 1528 is configured to send the navigation information to the user terminal.

Optionally, the receiving module is configured to receive a third obtaining request, the third obtaining request being sent by the user terminal when the coupon information is triggered. The response module is configured to send, to the user terminal according to the third obtaining request, a third page associated with the coupon information. The receiving module is configured to receive a coupon obtaining request sent by the user terminal. The response module is configured to issue an electronic coupon according to the coupon obtaining request. The sending module 1528 is configured to send the electronic coupon to the user terminal.

Optionally, the receiving module is configured to receive a fourth obtaining request, the fourth obtaining request being sent when the external link information is triggered. The response module is configured to send, to the user terminal according to the fourth obtaining request, a fourth page associated with the external link information.

Optionally, the promoted identifier includes a reject control. The receiving module is configured to receive a cancellation request, the cancellation request being sent by the user terminal when the reject control is triggered. The response module is configured to delete the dynamic information flow corresponding to the first user account from the dynamic information of the promoted account according to the cancellation request.

The dynamic information presentation apparatus 1540 includes:

a receiving module 1542, configured to receive a dynamic information flow corresponding to a first user account, the dynamic information flow being the information flow for presenting dynamic information of a second user account, the second user account having a social relationship with the first user account, the dynamic information flow further including dynamic information of a promoted account, and the promoted account corresponding to a second geographic location; and a display module 1544, configured to display the dynamic information flow corresponding to the first user account.

The dynamic information of the promoted account includes account information and content information.

The content information includes at least one type of information of picture information, text information, voice information, video information, geographic location information, coupon information, external link information, or a promoted identifier.

Optionally, the dynamic information presentation apparatus 1540 further includes a sending module (not shown in the figure).

The sending module is configured to send a first obtaining request to the platform server when the account information is triggered, so that the platform server sends a first page associated with the promoted account according to the first obtaining request. The receiving module 1542 is further configured to receive the first page that is associated with the promoted account and that is sent by the platform server.

Optionally, the first page includes a follow control. The sending module is further configured to send a follow request to the platform server when the follow control is triggered, the follow request being used for requesting following the promoted account, so that the platform server establishes a follow relationship of the first user account relative to the promoted account according to the follow request.

Optionally, the sending module is configured to send a second obtaining request to the platform server when the geographic location information is triggered, so that the platform server sends a second page associated with the geographic location information according to the second obtaining request. The receiving module 1542 is configured to receive the second page that is associated with the geographic location information and that is sent by the platform server.

Optionally, the second page includes a navigation control.

The sending module is further configured to send a navigation request to the platform server when the navigation control is triggered, the navigation request being used for requesting navigation information in which the second geographic location is a destination, so that the platform server generates the navigation information according to the navigation request.

The receiving module 1542 is further configured to receive the navigation information sent by the platform server.

Optionally the sending module is configured to send a third obtaining request to the platform server when the coupon information is triggered, so that the platform server sends, according to the third obtaining request, a third page associated with the coupon information.

The receiving module is configured to receive the third page that is associated with the coupon information and that is sent by the platform server.

Optionally, the third page includes a coupon obtaining control. The sending module is configured to send a coupon obtaining request to the platform server when the coupon obtaining control is triggered, so that the platform server issues an electronic coupon according to the coupon obtaining request.

The receiving module 1542 is further configured to receive the electronic coupon sent by the platform server.

Optionally, the sending module is configured to send a fourth obtaining request to the platform server when the external link information is triggered. The platform server sends, to the user terminal according to the fourth obtaining request, a fourth page associated with the external link information.

Optionally, the promoted identifier includes a reject control. The sending module is configured to send a cancellation request to the platform server when the reject control is triggered. The receiving module 1542 is further configured to delete the dynamic information flow corresponding to the first user account from the dynamic information of the promoted account according to the cancellation request.

It should be noted that, when the dynamic information presentation system provided in the foregoing embodiment presents the dynamic information, division of the foregoing functional modules is merely used as an example for description. In an actual application, the foregoing functions may be allocated to be accomplished by different functional modules according to requirements, that is, the internal structure of the device is divided into different functional modules, to accomplish all or some of the above described functions. In addition, the dynamic information presentation system provided in the foregoing embodiment belongs to the same concept as the embodiment of the dynamic information presentation method. Refer to the method embodiments for details of a specific implementation process thereof. Details are not described herein.

Figure 16:
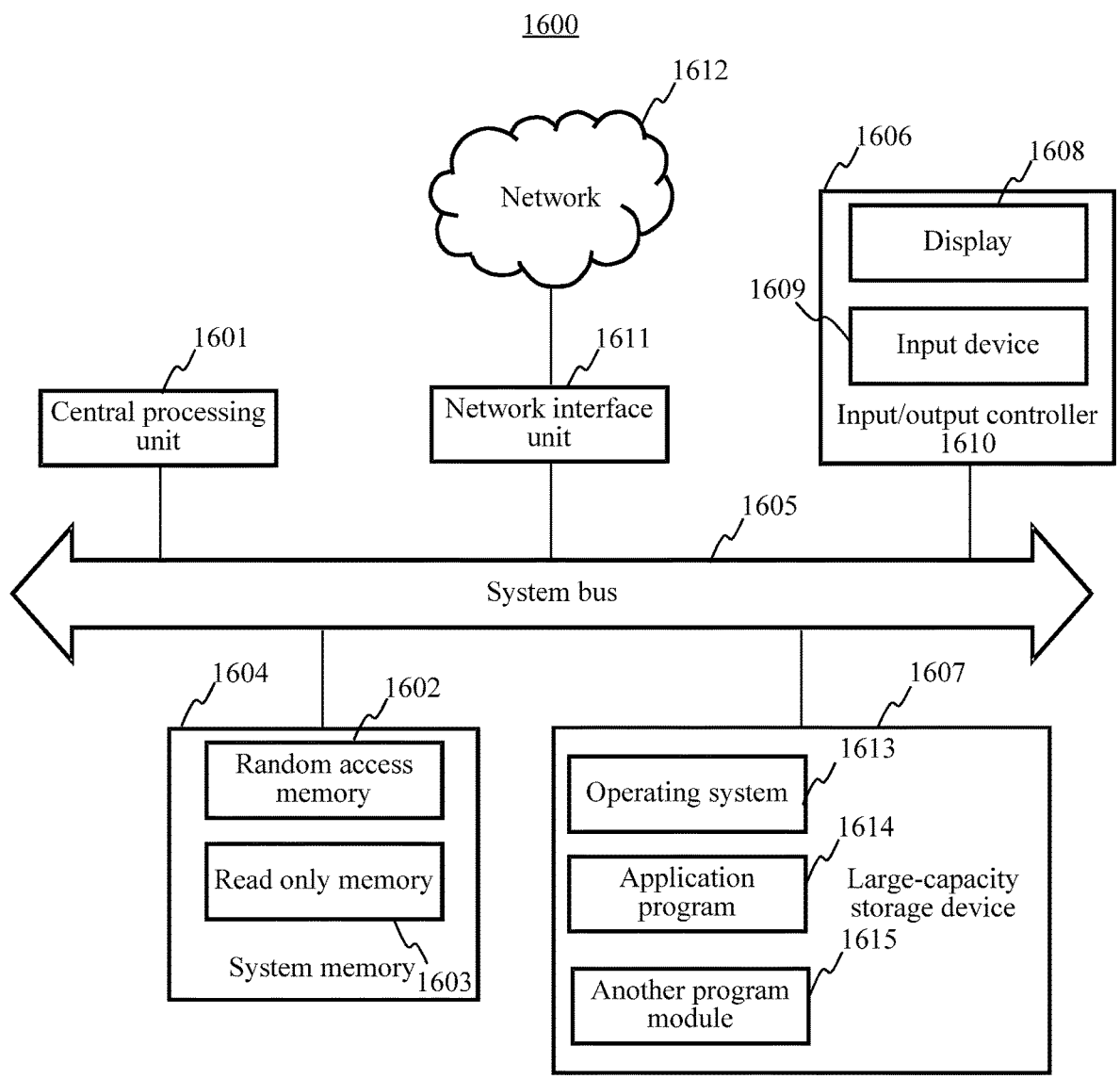
FIG. 16 is a schematic structural diagram of a platform server according to an exemplary embodiment.

Referring to FIG. 16, FIG. 16 is a schematic structural diagram of a platform server according to an exemplary embodiment. The platform server 1600 includes a central processing unit (CPU) 1601, a system memory 1604 including a random access memory (RAM) 1602 and a read only memory (ROM) 1603, and a system bus 1605 connecting the system memory 1604 and the CPU 1601. The server 1600 further includes a basic input/output system (I/O system) 1606 assisting in transmitting information between devices in a computer, and a large-capacity storage device 1607 configured to store an operating system 1613, an application program 1614 and another program module 1615.

The basic I/O system 1606 includes a display 1608 configured to display information and an input device 1609, such as a mouse or a keyboard, configured to input information for a user. The display 1608 and the input device 1607 are both connected to the CPU 1601 by using an input and output controller 1610 connected to the system bus 1605. The basic I/O system 1606 may further include the input and output controller 1610 to be configured to receive and process inputs from multiple other devices such as a keyboard, a mouse, and an electronic stylus. Similarly, the input and output controller 1610 further provides an output to a display screen, a printer or another type of output device.

The large-capacity storage device 1607 is connected to the CPU 1601 by using a large-capacity storage controller (not shown) connected to the system bus 1605. The large-capacity storage device 1607 and its associated computer readable medium provide non-volatile storage for the server 1600. That is, the large-capacity storage device 1607 may include a computer readable medium (not shown) such as a hard disk or a CD-ROM driver.

Without loss of generality, the computer readable medium may include a computer storage medium and a communications medium. The computer storage medium includes volatile and non-volatile media, and removable and nonremovable media implemented by using any method or technology used for storing information such as a computer readable instruction, a data structure, a program module or other data. The computer storage medium includes a RAM, a ROM, an EPROM, an EEPROM, a flash memory or another solid storage technology; a CD-ROM, a DVD or another optical storage; and a cassette, a magnetic tape, a disk storage or another magnetic storage device. Certainly, a person skilled in art may know that the computer storage medium is not limited to the foregoing several types. The system memory 1604 and the large-capacity storage device 1607 may be collectively referred to as a memory.

According to various embodiments, the server 1600 may further be connected, by using a network such as the Internet, to a remote computer on the network and run. That is, the server 1600 may be connected to a network 1612 by using a network interface unit 1611 connected to the system bus 1605, or may also be to connected to another type of network or remote computer system (not shown) by using the network interface unit 1611.

The memory further includes one or more programs. The one or more programs are stored in the memory. The one or more programs are used for implementing the dynamic information presentation method or the dynamic information sending method that is implemented by the platform server provided in the foregoing embodiments.

Figure 17:
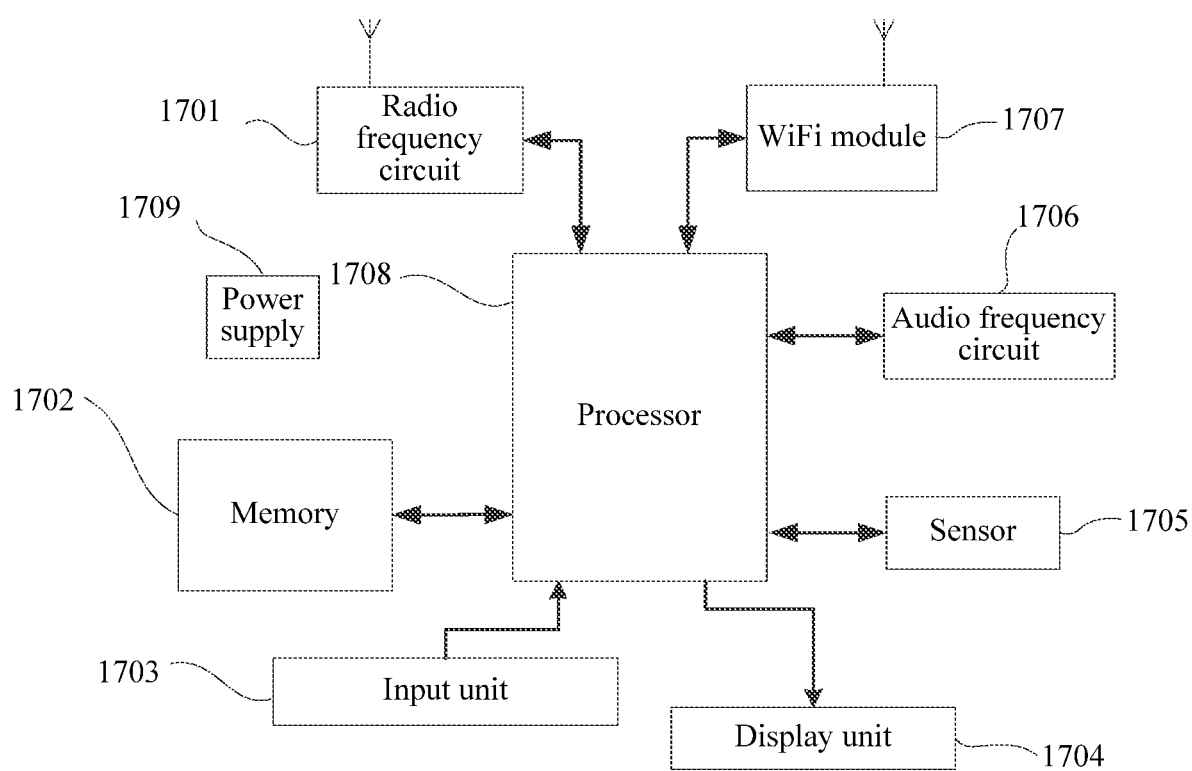
FIG. 17 is a schematic structural diagram of a user terminal according to an exemplary embodiment.

FIG. 17 is a schematic structural diagram of a user terminal according to an exemplary embodiment. The user terminal is logged in with a social client. As shown in 17, the user terminal may include parts such as a radio frequency (RF) circuit 1701, a memory 1702 including one or more computer readable storage media, an input unit 1703, a display unit 1704, a sensor 1705, an audio frequency circuit 1706, a Wireless Fidelity (WiFi) module 1707, a processor 1708 including one more processing cores, and a power supply 1709. A person skilled in the art may understand that the structure of the user terminal shown in FIG. 17 does not constitute a limitation to the user terminal, and the user terminal may include more components or fewer components than those shown in the figure, or some components may be combined, or a different component deployment may be used.

The RF circuit 1701 may be configured to receive and send signals during information receiving and sending or during a call. Particularly, the RF circuit 1701 receives downlink information from a base station, then delivers the downlink information to one or more processors 1708 for processing, and in addition, sends related uplink data to the base station. Generally, the RF circuit 1701 includes, but is not limited to, an antenna, at least one amplifier, a tuner, one or more oscillators, a subscriber identity module (SIM) card, a transceiver, a coupler, a low noise amplifier (LNA), a duplexer, and the like. In addition, the RF circuit 1701 may also communicate with a network and another device by means of wireless communication. The wireless communication may use any communications standard or protocol, which includes, but is not limited to, Global System for Mobile communications (GSM), General Packet Radio Service (GPRS), Code Division Multiple Access (CDMA), Wideband Code Division Multiple Access (WCDMA), Long Term Evolution (LTE), an email, a short messaging service (SMS), and the like.

The memory 1702 may be configured to store a software program and module. The processor 1708 runs the software program and module stored in the memory 1702, to implement various functional applications and data processing. The memory 1702 may mainly include a program storage area and a data storage area. The program storage area may store an operating system, an application program required by at least one function (such as a sound playback function and an image playback function), and the like. The data storage area may store data (such as audio data and a phone book) created according to use of the user terminal, and the like. In addition, the memory 1702 may include a high speed random access memory, and may further include a non-volatile memory, such as at least one magnetic disk storage device, a flash memory, or another volatile solid-state storage device. Correspondingly, the memory 1702 may further include a memory controller, to provide access of the processor 1708 and the input unit 1703 to the memory 1702.

The input unit 1703 may be configured to receive input digit or character information, and generate a keyboard, mouse, joystick, optical or track ball signal input related to the user setting and function control. Specifically, in a specific embodiment, the input unit 1703 may include a touch-sensitive surface and another input device. The touch-sensitive surface, which may also be referred to as a touch-screen or a touch panel, may collect a touch operation of a user on or near the touch-sensitive surface (for example, an operation of the user on or near the touch-sensitive surface by using any suitable object or accessory such as a finger or a stylus), and drive a corresponding connection apparatus according to a preset program. Optionally, the touch-sensitive surface may include two parts: a touch detection apparatus and a touch controller. The touch detection apparatus detects a touch position of the user, detects a signal generated by the touch operation, and transmits the signal to the touch controller. The touch controller receives touch information from the touch detection apparatus, converts the touch information into touch point coordinates, and sends the touch point coordinates to the processor 1708. Moreover, the touch controller can receive and execute an instruction sent by the processor 1708. In addition, the touch-sensitive surface may be implemented in multiple types, such as a resistive type, a capacitive type, an infrared type, and a surface acoustic wave type. In addition to the touch-sensitive surface, the input unit 1703 may further include another input device. Specifically, the another input device may include, but is not limited to, one or more of a physical keyboard, a function key (for example, a volume control key or a power on/off key), a trackball, a mouse, a joystick, or the like.

The display unit 1704 may be configured to display information input by the user or information provided for the user, and various graphical user interfaces of the user terminal. The graphical user interfaces may be composed of graphics, text, icons, videos, and any combination thereof. The display unit 1704 may include a display panel. Optionally, the display panel may be configured in a form of a liquid crystal display (LCD), an organic light-emitting diode (OLED), or the like. Further, the touch-sensitive surface may cover the display panel. After detecting a touch operation on or near the touch-sensitive surface, the touch-sensitive surface transmits the touch operation to the processor 1708, to determine a type of a touch event, and then the processor 1708 provides corresponding visual output on the display panel according to the type of the touch event. Although in FIG. 17, the touch-sensitive surface and the display panel are used as two separate parts to implement input and output functions, in some embodiments, the touch-sensitive surface and the display panel may be integrated to implement the input and output functions.

The user terminal may further include at least one sensor 1705 such as an optical sensor, a motion sensor, and another sensor. Specifically, the optical sensor may include an ambient light sensor and a proximity sensor. The ambient light sensor may adjust luminance of the display panel according to brightness of the ambient light. The proximity sensor may turn off the display panel and/or backlight when the user terminal is moved to an ear. As one type of the motion sensor, a gravity acceleration sensor may detect a value of acceleration at each direction (which generally is triaxial), may detect a value and a direction of the gravity when being static, and may be configured to identify an application of a mobile phone gesture (for example, a handover between horizontal and longitudinal screens, a related game, and gesture calibration of a magnetometer), a related function of vibration identification (for example, a pedometer and a knock), and the like. Another sensor, such as a gyroscope, a barometer, a hygrometer, a thermometer, and an infrared sensor, which can be configured in the user terminal is not described herein.

The audio circuit 1706, a speaker, and a microphone may provide audio interfaces between the user and the user terminal. The audio circuit 1706 may convert received audio data into an electrical signal and transmit the electric signal to the speaker. The speaker converts the electrical signal into a sound signal for output. On the other hand, the microphone converts a collected sound signal into an electrical signal. The audio circuit 1706 converts the electrical signal into audio data after receiving the electrical signal, and then outputs the audio data to the processor 1708 for processing. Then, the processor 1708 sends the audio data to, for example, another user terminal by using the RF circuit 1701, or outputs the audio data to the memory 1702 for further processing. The audio circuit 1706 may further include an earplug jack, to provide communication between a peripheral earphone and the user terminal.

WiFi is a short-range wireless transmission technology. The user terminal may assist the user in receiving and sending an e-mail, browsing a web page, accessing a streaming medium, and the like by using the WiFi module 1707. This provides wireless broadband Internet access for the user. Although FIG. 17 shows the WiFi module 1707, it may be understood that the WiFi module 1707 is not a necessary component of the user terminal, and the WiFi module 1707 may be omitted as required without changing the scope of the essence of the disclosure.

The processor 1708 is a control center of the user terminal, which is connected to various parts of the entire mobile phone by using various interfaces and lines, and by running or executing a software program and/or module stored in the memory 1702 and invoking data stored in the memory 1702, to perform various functions of the user terminal and process data, so as to perform overall monitoring on the mobile phone. Optionally, the processor 1708 may include one or more processing cores. Preferably, the processor 1708 may integrate an application processor and a modem processor. The application processor mainly processes an operating system, a user interface, an application program, and the like. The modem processor mainly processes wireless communication. It may be understood that the foregoing modem processor may alternatively not be integrated into the processor 1708.

The user terminal further includes the power supply 1709 (for example, a battery) for supplying power to the components. Preferably, the power supply may be logically connected to the processor 1708 by using a power management system, thereby implementing functions such as charging, discharging, and power consumption management by using the power management system. The power supply 1709 may further include one or more of a direct current or alternating current power supply, a re-charging system, a power failure detection circuit, a power supply converter or inverter, a power supply state indicator, and any other components.

Although not shown in the figure, the user terminal may further include a camera, a Bluetooth module, and the like, which are not described herein. Specifically, in this embodiment, the processor 1708 in the user terminal can run one or more program instructions stored in the memory 1702, to implement the dynamic information presentation method implemented by the user terminal provided in the foregoing method embodiments.

In an exemplary embodiment, a non-transitory computer readable storage medium including an instruction is further provided, for example, a memory including an instruction, and the foregoing instruction may be executed by a processor of a user terminal, to perform each step of the user terminal side in the foregoing method embodiments. For example, the non-transitory computer readable storage medium may be a ROM, a RAM, a CD-ROM, a magnetic disk, an optical disc, or the like.

Beneficial effects of the technical solutions provided by the exemplary embodiments include:

The platform server determines the matched promoted account according to the first geographic location associated with the first user account (or the first geographic location of a terminal associated with the first user account) and the second geographic location associated with the promoted account (or the second geographic location of a terminal associated with the promoted account), and adds dynamic information of the promoted account to the dynamic information flow corresponding to the first user account, so that the dynamic information flow includes both the dynamic information of the second user account and the dynamic information of the promoted account. Therefore, the problem that the related art dynamic information presentation function displays only dynamic information of other users having a friendship is solved, and the dynamic information presentation function displays not only the dynamic information of the second user account, but also dynamic information of a promoted account having an association relationship with the geographic location associated with the first user account, thereby enriching the technical effects of the presented dynamic information.

The foregoing descriptions are merely exemplary embodiments, but are not intended to limit the disclosure. Any modification, equivalent replacement, or improvement made within the spirit and principle of the disclosure shall fall within the protection scope of the disclosure.

What is claimed is:

1. A dynamic information presentation method, the method comprising:
    obtaining, by a social platform server related to an application, a first geographic location associated with a first user account from (i) a result of positioning by a positioning system of a user terminal at every preset time interval, the user terminal being associated with the first user account of the application and (ii) historical data of the first user account, the historical data comprising at least one of historically input address information, a geographic location associated with historical login, a geographic location associated with historical sign-in, or a historically reported geographic location;
    storing, by the social platform server, dynamic information of a promoted account to be presented and a delivery condition for delivering the dynamic information of the promoted account, the delivery condition being that a distance between the first geographic location associated with the first user account and a second geographic location associated with the promoted account is less than a preset threshold;

in response to satisfaction of the delivery condition of the dynamic information of the promoted account that the distance between the first geographic location associated with the first user account and the second geographic location associated with the promoted account is less than the preset threshold, adding the dynamic information of the promoted account stored in the social platform server to a dynamic information flow corresponding to the first user account of the application, the dynamic information flow being an information flow for providing dynamic information of a second user account of the application; and providing the dynamic information flow corresponding to the first user account to the user terminal to be displayed on an interface of the application to which the user terminal is logged in with the first user account, the user terminal being in communication with the social platform server via a network, wherein the dynamic information of the promoted account stored in the social platform server is not provided to the user terminal when the delivery condition that the distance between the first geographic location associated with the first user account and the second geographic location associated with the promoted account is less than the preset threshold is not satisfied, wherein the method further comprises, when the dynamic information of the promoted account is to be added in response to the satisfaction of the delivery condition of the dynamic information of the promoted account:

adding, by the social platform server, the dynamic information of the promoted account to the dynamic information flow corresponding to the first user account based on a quantity of pieces of unread dynamic information of the first user account that reaches a preset quantity threshold, and further based on detection that the dynamic information of the promoted account has not been previously added to the dynamic information flow corresponding to the first user account within a preset duration before a current time, and not adding, by the social platform server, the dynamic information of the promoted account to the dynamic information flow corresponding to the first user account based on the quantity of pieces of unread dynamic information that does not reach the preset quantity threshold, or based on detection that the dynamic information of the promoted account has been previously added to the dynamic information flow corresponding to the first user account within the preset duration before the current time, wherein the dynamic information of the promoted account comprises (i) account information of the promoted account, (ii) geographic location information including an address corresponding to the second geographic location associated with the promoted account, and (iii) a promoted identifier indicating that the dynamic information belongs to an account that is being promoted, items (i)-(iii) being interactive on the interface of the application, wherein the method further comprises:

receiving, by the social platform server, a first request from the user terminal when the geographic location information is triggered on the interface of the application displayed on the user terminal;

transmitting, by the social platform server, a first page comprising a navigation control to the user terminal in response to the first request, the navigation control being related to the geographic location information;

receiving, by the social platform server, a navigation request from the user terminal when the navigation control is triggered, wherein the navigation request is used for requesting navigation information in which the address corresponding to the second geographic location is a destination; and transmitting, by the social platform server, the navigation information to the user terminal in response to the navigation request, and wherein the method further comprises:

receiving, by the social platform server, a second request from the user terminal when the promoted identifier is triggered on the interface of the application displayed on the user terminal;

transmitting by the social platform server, a second page comprising a reject control related to the promoted identifier in response to the second request, the reject control being used for requesting deletion of the dynamic information of the promoted account from the dynamic information flow corresponding to the first user account; and receiving, by the social platform server, a deletion request from the user terminal when the reject control is triggered; deleting dynamic information of the promoted account from the dynamic information flow corresponding to the first user account and cancelling, in a subsequent process, displaying of the dynamic information of the promoted account in the dynamic information flow corresponding to the first user account.

2. The method according to claim 1, wherein the method further comprises:

receiving, by the social platform server, a third request from the user terminal when the account information is triggered; and transmitting, by the social platform server, a third page that is associated with the promoted account in response to the third request.

3. The method according to claim 2, wherein the third page comprises a follow control, and the method further comprises:

receiving, by the social platform server, a follow request from the user terminal when the follow control is triggered, wherein the follow request is used for requesting following the promoted account based on establishment of a follow relationship of the first user account relative to the promoted account.

4. The method according to claim 1, wherein the dynamic information of the promoted account comprises coupon information, and the method further comprises:

receiving, by the social platform server, a fourth request from the user terminal when the coupon information is triggered; and transmitting, by the social platform server, a fourth page that is associated with the coupon information to the user terminal in response to the fourth request.

5. The method according to claim 4, wherein the fourth page comprises a coupon obtaining control, and the method further comprises:

receiving, by the social platform server, a coupon request from the user terminal when the coupon obtaining control is triggered; and transmitting, by the social platform server, an electronic coupon to the user terminal in response to the coupon request.

6. The dynamic information presentation method according to claim 1, wherein the cancelling, in the subsequent process, displaying of the dynamic information of the promoted account, comprises:

updating, by the social platform server, a delivery condition corresponding to the first user account according to the rejected promoted account such that a same type of a promoted account as that of the rejected promoted account triggered is not added to the dynamic information flow corresponding to the first user account in the subsequent process.

7. A dynamic information sending apparatus, the apparatus comprising:

at least one memory operable to store program code; and at least one processor operable to read the program code, and operate as instructed by the program code to:

obtain a first geographic location associated with a first user account from (i) a result of positioning by a positioning system of a user terminal at every preset time interval, the user terminal being associated with the first user account of an application related to a social platform server and (ii) historical data of the first user account, the historical data comprising at least one of historically input address information, a geographic location associated with historical login, a geographic location associated with historical sign-in, or a historically reported geographic location;

store, in the social platform server, dynamic information of a promoted account to be presented and a delivery condition for delivery the dynamic information of the promoted account, the delivery condition including a condition that a distance between the first geographic location associated with the first user account and a second geographic location associated with the promoted account is less than a preset threshold;

in response to satisfaction of the delivery condition of the dynamic information of the promoted account that the distance between the first geographic location associated with the first user account and the second geographic location associated with the promoted account is less than the preset threshold, add the dynamic information of the promoted account stored in the social platform server to a dynamic information flow corresponding to the first user account of the application, the dynamic information flow being an information flow for providing dynamic information of a second user account of the application; and provide the dynamic information flow corresponding to the first user account to the user terminal to be displayed on an interface of the application to which the user terminal is logged in with the first user account, the user terminal being in communication with the social platform server via a network, wherein the dynamic information of the promoted account stored in the social platform server is not provided to the user terminal when the delivery condition that the distance between the first geographic location associated with the first user account and the second geographic location associated with the promoted account is less than the preset threshold is not satisfied, wherein the at least one processor is further configured to, when the dynamic information of the promoted account is to be added in response to the satisfaction of the delivery condition of the dynamic information of the promoted account:

add the dynamic information of the promoted account to the dynamic information flow corresponding to the first user account based on a quantity of pieces of unread dynamic information of the first user account that reaches a preset quantity threshold, and further based on detection that the dynamic information of the promoted account has not been previously added to the dynamic information flow corresponding to the first user account within a preset duration before a current time, and not add the dynamic information of the promoted account to the dynamic information flow corresponding to the first user account based on the quantity of pieces of unread dynamic information that does not reach the preset quantity threshold, or based on detection that the dynamic information of the promoted account has been previously added to the dynamic information flow corresponding to the first user account within the preset duration before the current time, wherein the dynamic information of the promoted account comprises (i) account information of the promoted account, (ii) geographic location information including an address corresponding to the second geographic location associated with the promoted account, and (iii) a promoted identifier indicating that the dynamic information belongs to an account that is being promoted, items (i)-(iii) being interactive on the interface of the application, wherein the at least one processor is further configured to:

receive a first request from the user terminal when the geographic location information is triggered on the interface of the application displayed on the user terminal;

transmit a first page comprising a navigation control to the user terminal in response to the first request, the navigation control being related to the geographic location information;

receive a navigation request from the user terminal when the navigation control is triggered, wherein the navigation request is used for requesting navigation information in which the address corresponding to the second geographic location is a destination; and transmit the navigation information to the user terminal in response to the navigation request, and wherein the at least one processor is further configured to:

receive a second request from the user terminal when the promoted identifier is triggered on the interface of the application displayed on the user terminal;

transmit a second page comprising a reject control related to the promoted identifier in response to the second request, the reject control being used for requesting deletion of the dynamic information of the promoted account from the dynamic information flow corresponding to the first user account; and receive a deletion request from the user terminal when the reject control is triggered; delete dynamic information of the promoted account from the dynamic information flow corresponding to the first user account and cancel, in a subsequent process, displaying of the dynamic information of the promoted account in the dynamic information flow corresponding to the first user account.

8. The apparatus according to claim 7, wherein the at least one processor further operates as instructed by the program code to:
receive, from the user terminal, a third request when the account information is triggered; and
transmit, to the user terminal, a third page that is associated with the promoted account in response to the third request.

9. The apparatus according to claim 8, wherein the third page comprises a follow control, and
the at least one processor further operates as instructed by the program code to receive a follow request from the user terminal when the follow control is triggered, wherein the follow request is used for requesting following the promoted account based on establishment of a follow relationship of the first user account relative to the promoted account.

10. The apparatus according to claim 7, wherein the dynamic information of the promoted account comprises coupon information, and the at least one processor further operates as instructed by the program code to:
receive, from the user terminal, a fourth request when the coupon information is triggered; and
transmit, to the user terminal, a fourth page that is associated with the coupon information in response to the fourth request.

11. The apparatus according to claim 10, wherein the fourth page comprises a coupon obtaining control, and the at least one processor further operates as instructed by the program code to:
receive, from the user terminal, a coupon request when the coupon obtaining control is triggered; and
transmit, to the user terminal, an electronic coupon in response to the coupon request.

12. A non-transitory computer-readable storage medium having stored therein a computer readable code, which, when executed by at least one processor of a social platform server, causes the at least one processor to perform:
obtaining a first geographic location associated with a first user account from (i) a result of positioning by a positioning system of a user terminal at every preset time interval, the user terminal being associated with the first user account of an application related to the application and (ii) historical data of the first user account, the historical data comprising at least one of historically input address information, a geographic location associated with historical login, a geographic location associated with historical sign-in, or a historically reported geographic location;
storing dynamic information of a promoted account to be presented and a delivery condition for delivery the dynamic information of the promoted account, the delivery condition including a condition that a distance between the first geographic location associated with the first user account and a second geographic location associated with the promoted account is less than a preset threshold;
in response to satisfaction of the delivery condition of the dynamic information of the promoted account that the distance between the first geographic location associated with the first user account and the second geographic location associated with the promoted account is less than the preset threshold, adding the dynamic information of the promoted account stored in the social platform server to a dynamic information flow corresponding to the first user account of the application, the dynamic information flow being an information flow for providing dynamic information of a second user account of the application; and
providing the dynamic information flow corresponding to the first user account to the user terminal to be displayed on an interface of the application to which the user terminal is logged in with the first user account, the user terminal being in communication with the social platform server via a network,
wherein the dynamic information of the promoted account stored in the social platform server is not provided to the user terminal when the delivery condition that the distance between the first geographic location associated with the first user account and the second geographic location associated with the promoted account is less than the preset threshold is not satisfied,
wherein the at least one processor is further caused to perform, when the dynamic information of the promoted account is to be added in response to the satisfaction of the delivery condition of the dynamic information of the promoted account:
adding the dynamic information of the promoted account to the dynamic information flow corresponding to the first user account based on a quantity of pieces of unread dynamic information of the first user account that reaches a preset quantity threshold, and further based on detection that the dynamic information of the promoted account has not been previously added to the dynamic information flow corresponding to the first user account within a preset duration before a current time, and
not adding the dynamic information of the promoted account to the dynamic information flow corresponding to the first user account based on the quantity of pieces of unread dynamic information that does not reach the preset quantity threshold, or based on detection that the dynamic information of the promoted account has been previously added to the dynamic information flow corresponding to the first user account within the preset duration before the current time,
wherein the dynamic information of the promoted account comprises (i) account information of the promoted account, (ii) geographic location information including an address corresponding to the second geographic location associated with the promoted account, and (iii) a promoted identifier indicating that the dynamic information belongs to an account that is being promoted, items (i)-(iii) being interactive on the interface of the application,
wherein the at least one processor is further caused to perform:
receiving a first request from the user terminal when the geographic location information is triggered on the interface of the application displayed on the user terminal;
transmitting a first page comprising a navigation control to the user terminal in response to the first request, the navigation control being related to the geographic location information;
receiving a navigation request from the user terminal when the navigation control is triggered, wherein the navigation request is used for requesting navigation information in which the address corresponding to the second geographic location is a destination; and transmitting the navigation information to the user terminal in response to the navigation request, and wherein the at least one processor is further caused to perform:

receiving a second request from the user terminal when the promoted identifier is triggered on the interface of the application displayed on the user terminal;

transmitting a second page comprising a reject control related to the promoted identifier in response to the second request, the reject control being used for requesting deletion of the dynamic information of the promoted account from the dynamic information flow corresponding to the first user account; and receiving a deletion request from the user terminal when the reject control is triggered; deleting dynamic information of the promoted account from the dynamic information flow corresponding to the first user account and cancelling, in a subsequent process, displaying of the dynamic information of the promoted account in the dynamic information flow corresponding to the first user account.

13. The non-transitory computer-readable storage medium according to claim 12, wherein the computer readable code causes the at least one processor to perform:

receiving, from the user terminal, a third request when the account information is triggered, so that the social platform server sends; and transmitting, to the user terminal, a third page that is associated with the promoted account in response to the third request.

14. The non-transitory computer-readable storage medium according to claim 13, wherein the third page comprises a follow control, and the computer readable code causes the at least one processor to perform:

receiving, from the user terminal, a follow request when the follow control is triggered, wherein the follow request is used for requesting following the promoted account based on establishment of a follow relationship of the first user account relative to the promoted account according to the follow request.

15. The non-transitory computer-readable storage medium according to claim 12, wherein the dynamic information of the promoted account comprises coupon information, and the computer readable code causes the at least one processor to perform:

receiving, from the user terminal, a fourth request when the coupon information is triggered; and transmitting, to the user terminal, a fourth page that is associated with the coupon information in response to the fourth request.

* * * * *